US011020655B2

(12) United States Patent
Nelson et al.

(10) Patent No.: US 11,020,655 B2
(45) Date of Patent: *Jun. 1, 2021

(54) CALIBRATION BIAS CONTROL IN USER INPUT DEVICES

(71) Applicant: Microsoft Technology Licensing, LLC, Redmond, WA (US)

(72) Inventors: Ross Anthony Nelson, Seattle, WA (US); Aaron Schmitz, Redmond, WA (US); Curtis F. McClive, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,941

(22) Filed: Jan. 7, 2020

(65) Prior Publication Data

US 2020/0139230 A1    May 7, 2020

Related U.S. Application Data

(63) Continuation of application No. 15/793,614, filed on Oct. 25, 2017, now Pat. No. 10,556,174.

(51) Int. Cl.
*A63F 13/22*    (2014.01)
*A63F 13/428*    (2014.01)
(Continued)

(52) U.S. Cl.
CPC ............ *A63F 13/22* (2014.09); *A63F 13/211* (2014.09); *A63F 13/23* (2014.09); *A63F 13/235* (2014.09);
(Continued)

(58) Field of Classification Search
None
See application file for complete search history.

(56) References Cited

U.S. PATENT DOCUMENTS 5,877,748 A * 3/1999 Redlich ................. G06F 3/011
345/159
9,041,689 B1 5/2015 Zhou et al.
(Continued)

FOREIGN PATENT DOCUMENTS

CN    104321115 A    1/2015
CN    105324736 A    2/2016

OTHER PUBLICATIONS

"Non Final Office Action Issued in U.S. Appl. No. 16/584,772", dated Sep. 9, 2020, 6 Pages.
(Continued)

*Primary Examiner* — Jason T Yen

(57) ABSTRACT

User input devices, such as gaming controllers, are provided herein. In one example, a system includes a movement calibration system configured to determine qualification zones that qualify peak excursions in movement data associated with manipulation of a control mechanism in one or more axes. The movement calibration system is configured to establish updates to the qualification zones based on changes in the movement data, where the updates bias drift of the qualification zones outward in the one or more axes. The movement calibration system is configured to determine calibrated movement data based at least on the updates to the qualification zones. The calibrated movement data can be provided for use in controlling one or more user interface elements with the control mechanism.

20 Claims, 9 Drawing Sheets

(51) Int. Cl.
    *A63F 13/235*    (2014.01)
    *A63F 13/211*    (2014.01)
    *G06F 3/038*     (2013.01)
    *G06F 3/0346*    (2013.01)
    *A63F 13/23*     (2014.01)
    *A63F 13/42*     (2014.01)
    *A63F 13/24*     (2014.01)
    *A63F 13/92*     (2014.01)
    *G06F 3/0338*    (2013.01)
    *A63F 9/24*      (2006.01)
    *G05G 9/047*     (2006.01)

(52) U.S. Cl.
    CPC .............. *A63F 13/24* (2014.09); *A63F 13/42* (2014.09); *A63F 13/428* (2014.09); *A63F 13/92* (2014.09); *G06F 3/038* (2013.01); *G06F 3/0338* (2013.01); *G06F 3/0346* (2013.01); *G06F 3/0383* (2013.01); *A63F 2009/2447* (2013.01); *A63F 2300/105* (2013.01); *A63F 2300/6045* (2013.01); *G05G 9/047* (2013.01)

(56) References Cited

U.S. PATENT DOCUMENTS

2017/0255279 A1\*   9/2017   McClive ............... G06F 3/0383
2020/0030690 A1    1/2020   Nelson et al.

OTHER PUBLICATIONS

"First Office Action and Search Report Issued in Chinese Patent Application No. 201780016091.X", dated Dec. 2, 2020, 13 Pages.

\* cited by examiner

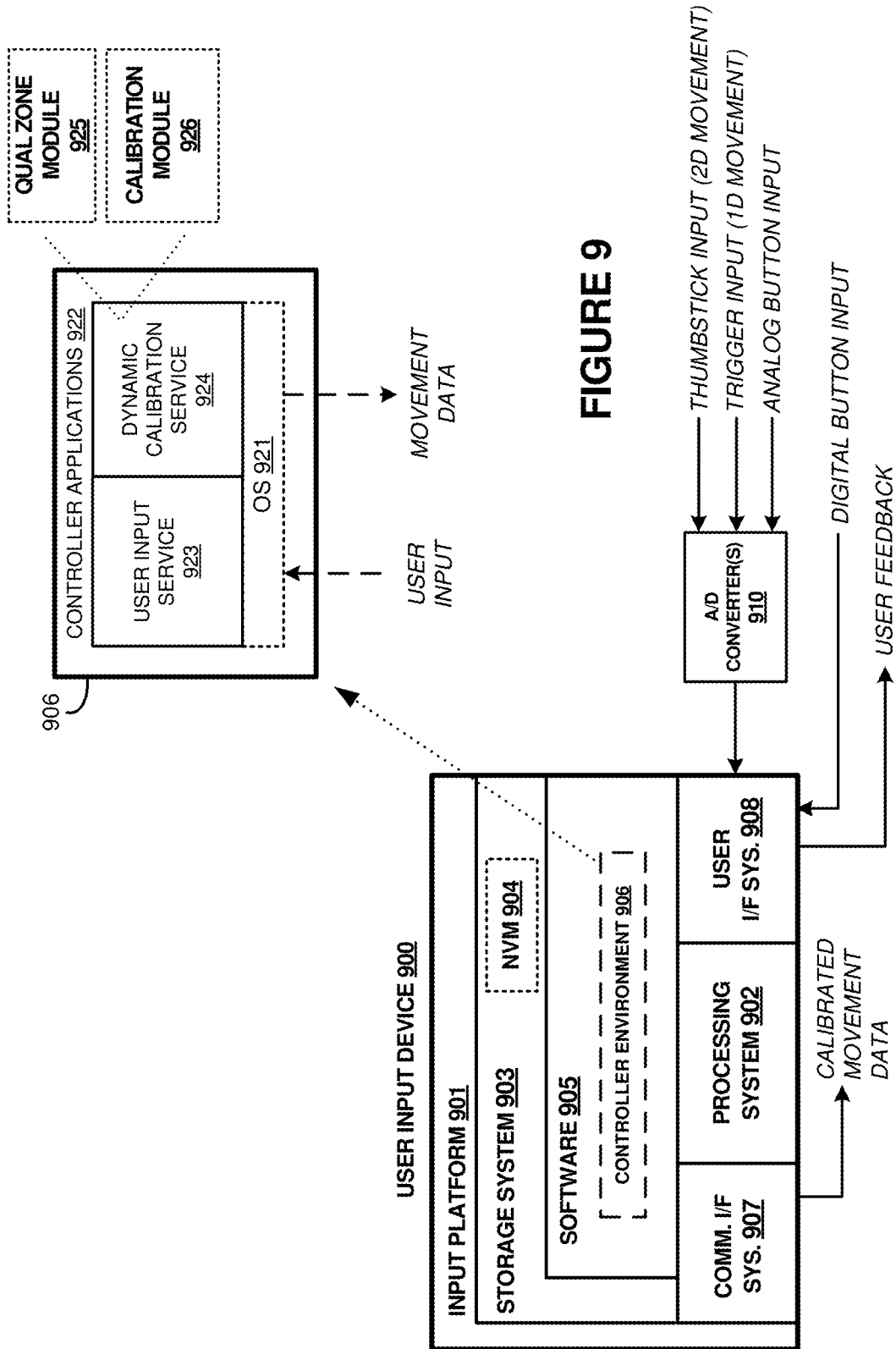

CALIBRATION BIAS CONTROL IN USER INPUT DEVICES

RELATED APPLICATIONS

This application is a continuation of, and claims priority to, U.S. patent application Ser. No. 15/793,614, entitled "CALIBRATION BIAS FOR CONTROL MECHANISMS IN USER INPUT DEVICES," and filed Oct. 25, 2017, which is hereby incorporated by reference in its entirety.

BACKGROUND

User input devices, such as gaming controllers, can include various proportional and analog-type controls, such as joysticks, thumbsticks, control sticks, proportional triggers, or other input mechanisms. These input mechanisms typically include both mechanical and electrical elements to allow for user manipulation in one or more directional axes. The user input devices can be employed in various interactive systems, such as discrete gaming consoles, computer gaming environments, portable gaming systems, and other devices and systems, which might also include aviation, military, or industrial control systems. The Microsoft Xbox® family of gaming systems are examples which can employ these user input devices, with a gaming console configured to communicate with gaming controllers over wired or wireless interfaces.

OVERVIEW

User input devices, such as gaming controllers, are provided herein. In one example, a system includes a movement calibration system configured to determine qualification zones that qualify peak excursions in movement data associated with manipulation of a control mechanism in one or more axes. The movement calibration system is configured to establish updates to the qualification zones based on changes in the movement data, where the updates bias drift of the qualification zones outward in the one or more axes. The movement calibration system is configured to determine calibrated movement data based at least on the updates to the qualification zones. The calibrated movement data can be provided for use in controlling one or more user interface elements with the control mechanism.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 9 illustrates an example user input device suitable for implementing any of the architectures, processes, methods, and operational scenarios disclosed herein.

DETAILED DESCRIPTION

Figure 1:
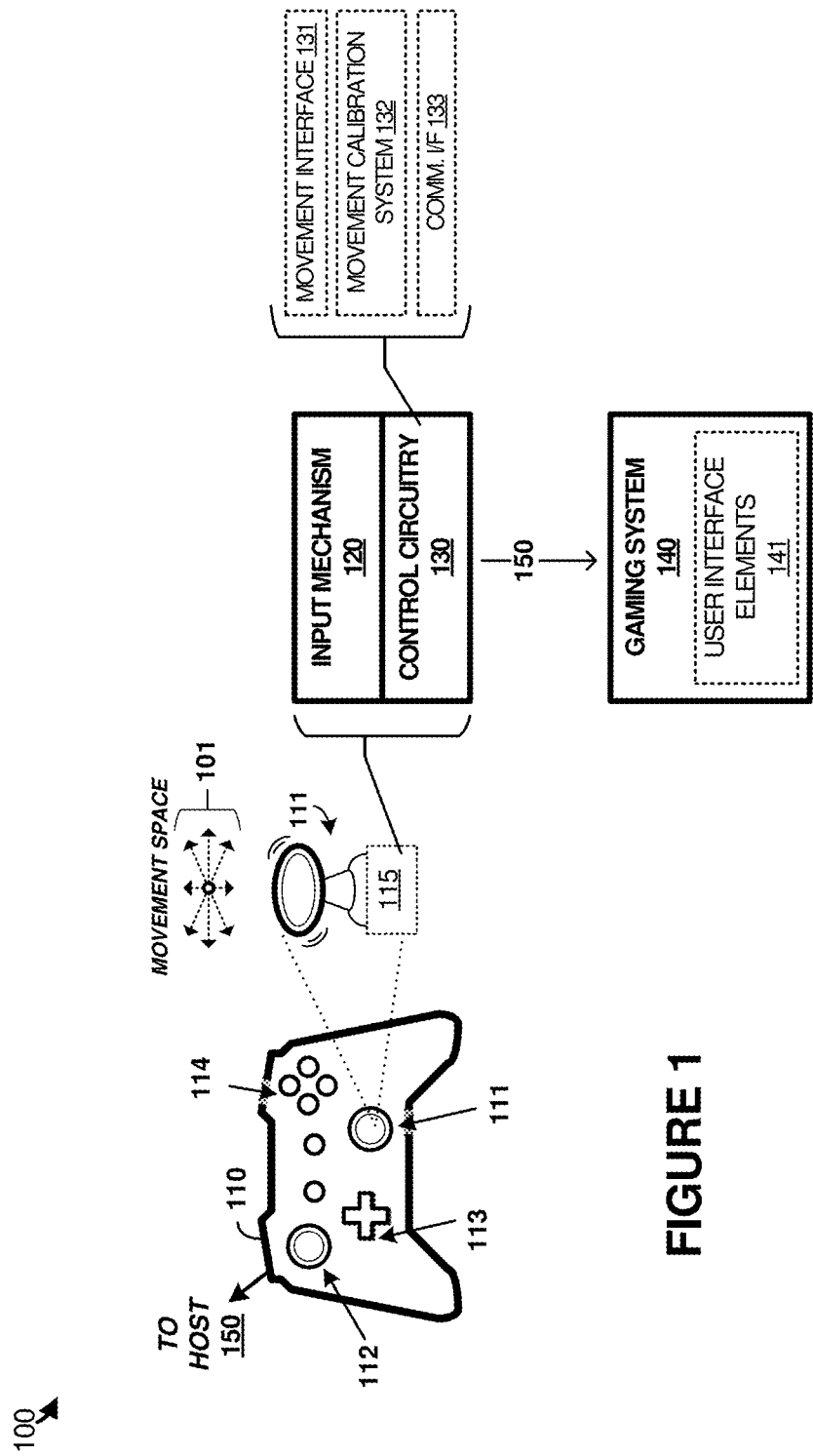
FIG. 1 is a system diagram of a user input environment in an implementation.

User input devices, such as gaming controllers, can include control stick mechanisms to allow a user to interact with on-screen elements. The user input devices can be employed in various interactive systems, such as discrete gaming consoles, computer gaming environments, portable gaming systems, and other devices and systems. Many types of gaming systems can employ these user input devices with a gaming console or other system configured to communicate with gaming controllers over wired or wireless interfaces. In further examples, user input control mechanisms are employed in automotive, aviation, military, or industrial control settings.

Electromechanical elements included in the control stick mechanisms can be difficult to manufacture in a precise and repeatable manner, and mechanical elements used for the control stick mechanisms can have limited precision for tracking user input manipulation. Example control mechanisms include thumbsticks or triggers which allow for user manipulation using a finger or thumb. When a user is not engaging the control mechanisms, the control mechanisms can responsively return to a central resting position using springs, bands, motors, servos, or other return elements. Also, users can typically move the control mechanisms over a maximum movement range, bounded by mechanical limits among other factors. This resting position and maximum movement range can vary over time within a device or from device-to-device depending upon manufacturing variability, component variation, wear levels of components, and other factors.

Calibration of control stick mechanisms and associated gaming controllers can be challenging due to variations over time and from device-to-device. Dead zones have been employed to ignore user input in central regions or perimeter regions of a control stick movement area to compensate for these variations. However, when a dead zone is not employed properly or not sized properly, then a user application, such as a game, might poorly interpret control stick positioning or result in lessening of the usable movement space. Moreover, calibration of these control sticks and associated mechanisms can become inaccurate over time, in part due to variations in user input activity.

Normalizing of control stick movement can be performed to alter tracking of a control stick mechanism in light of measured movement extremes and resting positions. This normalization can include the usage of qualification zones which qualify resting points (central region) or maximum excursions (perimeter regions) of control stick movement to measure in situ performance of the control stick mechanisms and determine variations and deviations from ideal behavior. Various mapping of the actual movement to a preferred movement space can also be achieved using these qualification zones and in situ measurement of the control stick performance.

However, certain user applications and games can still encounter problems when normalized movement spaces and movement mappings are employed. In some examples, a game might comprise a first-person shooter (FPS) style of game where primary user movement in a restricted subset of movement axes, such as frequent left-to-right movement for altering a viewpoint of an associated avatar or in-game character with less frequent up-down movement. Other examples include user interaction modes where only an up-down movement is employed or employed much more frequently than side-to-side movement. Many times, multiple control sticks are employed on a gaming controller and one control stick might be designated for certain functions that focus on a first set of movement axes, while another control stick might be designated for other functions that focus on a second set of movement axes. Other examples include trigger mechanisms where only a subset of the movement space is employed on average.

The examples herein employ enhanced calibration techniques for user control mechanisms, such as for control sticks in gaming controllers, among other user input devices. The enhanced calibration techniques employ one or more qualification zones that qualify resting points (central regions) and transit extremes (perimeter regions) of a control stick movement. These qualification zones can be used to establish a measured movement space for the control stick mechanism and be further employed to normalize the measured movement of the control stick to a preferred movement space, or to map measured movement data for an altered response of the control stick mechanism. However, enhanced perimeter qualification zones discussed herein include specialized features for biasing changes to the qualification zones in an 'outward' direction along a corresponding axis or cardinal direction. These enhanced perimeter qualification zones can provide better calibration for movement of user input devices, especially in use cases where the user application or game employs certain movement directions with more frequency than other movement directions. Better gameplay and user control of user interface elements can be achieved, along with more accurate calibration of gaming controllers and other input devices.

As a first example of enhanced calibration in a user interface device or user input device, FIG. 1 is presented. FIG. 1 is a system diagram illustrating user input environment 100. Environment 100 includes gaming controller 110 and gaming system 140. Gaming controller 110 and gaming system 140 communicate over one or more links 150. Links 150 can comprise wireless or wired links, and are discussed in further detail below. Although gaming controllers and gaming systems are employed in environment 100, it should be understood that the discussion can also apply to other user input devices and user systems.

In operation, a user will employ gaming controller 110 to interact with gaming system 140 using one or more input mechanisms, such as control sticks 111-112, directional pad (d-pad) 113, and buttons 114. Further input mechanisms can be employed, such as triggers, voice controls, touchpads, touchscreens, or other input mechanisms, including combinations thereof. Control circuitry 130, movement interface 131, movement calibration system 132, and communication interface 133 can be employed to determine dynamically calibrated movement data and provide this dynamically calibrated movement data to a gaming system or other external system. In other examples, one or more of movement interface 131 and movement calibration system 132 may instead be employed on gaming system 140, and control circuitry 130 can transfer unprocessed (i.e. raw) or partially-processed movement data over link 150 for determination of the dynamically calibrated movement data by gaming system 140. Other combinations of elements of gaming controller 110 and gaming system 140 can perform the operations discussed herein.

A detailed view of one control stick is shown in FIG. 1, namely for control stick 111. Control stick 111 includes a thumb stick portion for interfacing with a finger or thumb of a user over one or more axes that define movement space 101. Control stick 111 is a part of control stick system 115 that further comprises input mechanism 120 and control circuitry 130. Control circuitry 130 can comprise one or more control modules, namely movement interface 131, movement calibration system 132, and communication interface 133.

Input mechanism 120 includes one or more mechanisms which receive and respond to user manipulation of control stick 111. These mechanisms can include electromechanical elements, tension elements, spring elements, servo elements, motor elements, as well as structural elements which support and position control stick 111 with respect to measurement elements. Measurement elements, such as position sensing elements and transducer elements, can be included in control circuitry 130 and can comprise potentiometers, position determination circuitry, angular resolvers, optoelectronic position sensors, magnetic sensors such as Hall effect sensors or magnetoresistive sensors, encoders, capacitive sensors, inductive sensors, or other position measurement elements and position sensing elements. Analog-to-digital (A/D) conversion elements can also be included in control circuitry to translate analog measurement or positioning signals into digital movement data. These digital representations can be introduced to processing elements of control circuitry 130 for transfer over link 150 to gaming system 140 and control of user interface elements 141. However, as discussed herein, various dynamic calibration elements are included which can alter the digital representations to provide more accurate and precise control of user interface elements 141. Specifically, movement interface 131, movement calibration system 132, and communication interface 133 are employed in control circuitry 130.

Control circuitry 130 can comprise one or more microcontrollers, microprocessors, application-specific integrated circuits (ASICs), field-programmable gate arrays (FPGA), or discrete logic and associated circuitry, including combinations thereof. Control circuitry 130 can include, or be paired with, one or more analog-to-digital conversion elements to receive user input associated with controller 110 and input mechanisms 120. Further examples of control circuitry 130 are illustrated in input platform of FIG. 9.

Movement interface 131 comprises one or more digital interfaces configured to receive digital representations of movement data encoded by elements of input mechanism 120. Movement interface 131 can comprise a logical or physical interface, which might include one or more buffers, signal conditioners, signal debounce features, transceivers, wired or wireless interfaces, serial or parallel interfaces, among other elements.

Movement calibration system 132 comprises a calibration service configured to receive digital movement data from movement interface 131 and apply one or more calibrations to the digital movement data to determine calibrated movement data. Movement calibration system 132 comprises data processing elements, data storage elements, movement analysis and averaging functions, among other elements. In some examples, movement calibration system 132 comprises discrete logic and circuitry, while in further examples movement calibration system 132 comprises one or more portions of various microprocessors, software, firmware, storage, and related elements. Movement calibration system 132 might comprise one or more computer-executable instructions stored on non-transitory storage media, such as discussed below in FIG. 9, although variations are possible. Movement calibration system 132 can store calibration data, historical movement data, and other information related to the calibration services provided by control circuitry 130.

Communication interface 133 comprises transceivers, interfacing circuitry, control logic, and other elements for communicating movement data, calibrated movement data, and other information over link 150. Communication interface 133 can comprise circuitry, processing elements, and software that communicates over various protocols and formats, such as universal serial bus (USB), proprietary communication signaling, Internet Protocol (IP), Ethernet, transmission control protocol (TCP), WiFi (IEEE 802.11), Bluetooth, near-field communication (NFC), infrared communications, other wired or wireless data interfaces, or some other communication format, including combinations, improvements, or variations thereof.

Advantageously, the enhanced user input device elements and calibration processes discussed herein provide for more accurate user input control of user interface elements in gaming systems, or other systems discussed herein. The use of dead zones or other associated unresponsive zones is reduced or eliminated using the processes discussed herein. These improvements to input device control and calibration have the technical effect of increasing accuracy and precision of user input devices, affording greater control of on-screen elements in gaming systems or associated mechanisms in automotive, industrial, or aviation systems as well as increasing the usable range of thumbstick motion.

Figure 2:
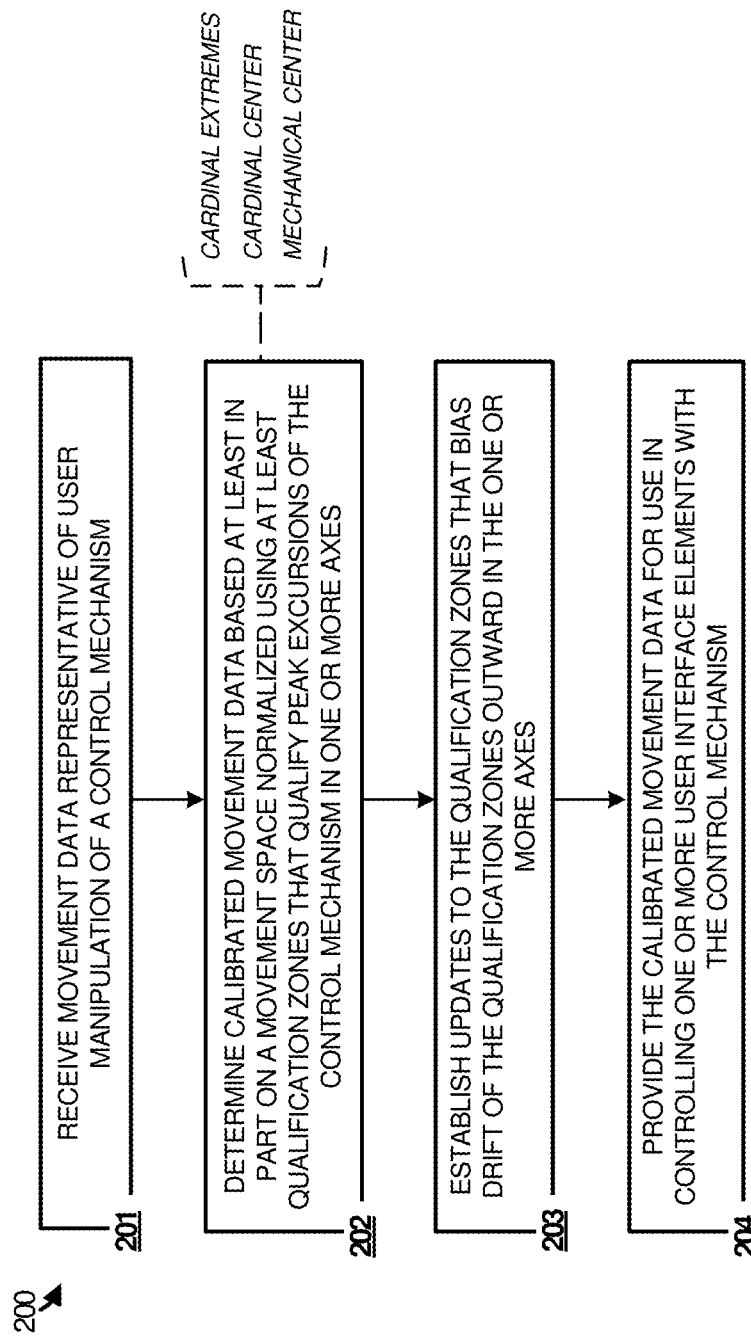
FIG. 2 illustrates a method of operating a user input device in an implementation.

FIG. 2 is a flow diagram illustrating a method of operation of controller 110 in environment 100. The operations of FIG. 2 are referenced parenthetically below. In FIG. 2, control circuitry 130 receives (201) movement data representative of user manipulation of input mechanism 120. Specifically, control circuitry 130 can receive and monitor movement data samples related to control stick 111 (or any user interface element in controller 110). Movement data samples can comprise digital representations of position or movement of control stick 111 through movement space 101, indicating transit events through the movement space 101. In some examples, control circuitry 130 converts analog movement or position signaling into digital signaling and monitors the digital signaling, while in other examples input mechanism 120 can output digital signals representative of movement of control stick 111 to control circuitry 130.

During operation, new samples of the movement data are captured and applied using one or more functions to existing samples, populations of existing samples, or existing sequences of samples to determine new values of the various calibration data, such as for qualification zones, peak hold data, means or averages, cardinal extremes, center points, or other calibration data. In some examples, a set or sequence of samples of the movement data are maintained by control circuitry 130, which can be included in a data structure comprising positional data samples. The samples can comprise positional data for control stick 111 determined periodically, such as every 'n' number of milliseconds. The set can include a predetermined number of samples, such as the last 'm' number of samples taken. A rolling window of samples can be established to replace the oldest members of the set with new samples. This rolling window can be advanced for each power cycle of controller 110, each usage session of controller 110, or continually over a fixed number of samples. The number of samples in the set can vary. In thumbstick examples, a two-dimensional (2D) data set can be maintained, which cover movement space 101. In proportional trigger examples, a one-dimensional (1D) data set or single-axis movement space can instead be employed. In further examples, such as for virtual/mixed reality controllers, three-dimensional (3D) data sets can be maintained for 3D control input devices.

Measured data samples as monitored by control circuitry 130 can be processed to determine (202) calibrated movement data based at least in part on a movement space normalized using at least qualification zones that qualify peak excursions of the control mechanism in one or more axes. In many examples, these qualification zones are employed to focus the calibration processing on a certain subset of movement samples that fit certain criteria, instead of on the entire set of movement data. Each qualification zone is sized and positioned to capture a certain portion of the movement data for a particular perimeter region or a central region. From these qualification zones, associated movement data can be processed to determine transit extremes in the affected perimeter regions, and resting positions for center qualification zones. Typically, the perimeter regions will have at least one qualification zone associated with each particular axis of movement, such as four qualification zones representing the +/−x and +/−y directions for a standard x-y two-dimensional movement space. These can be associated with cardinal directions of the control mechanism, such as up/down and left/right, but might instead be aligned with any arbitrary axis rotation. An additional center qualification zone can also be employed for processing 'central' movement data that indicates when the control mechanism is at rest.

From these qualification zones, a movement space can be determined and this movement space can be normalized to a predetermined configuration, such as a predetermined shape, size, or orientation, among other configurations. Calibrated movement data can be achieved using these qualification zones and normalization processes. Further mapping of the movement data can be performed to fit, resize, or rescale a measured movement space to a desired movement space, such as when the measured movement space has irregularities or abnormal shapes than ideal.

A discussion of the process of using qualification zones to determine this calibrated and normalized movement data is found below. However, in FIG. 2, additional processing is performed on these qualification zones to dynamically size and position one or more of the qualification zones according to a bias or preferential weighting in particular directions. Typically, these particular directions align with the one or more axes associated with the control stick movement, such as x-y axes. As mentioned above, certain user applications (such as games) might have user movement via the control stick mechanism that is restricted or limited in one or more directions, such as in first-person shooters, among other games. This restricted movement can lead to gradual migration of the perimeter qualification zones away from the perimeter of the actual movement space of the control stick mechanism. The migration can thus lead to inaccuracies in calibration and movement space determination and normalization processes.

Control circuitry 130 establishes (203) updates to the qualification zones that bias drift of the qualification zones outward in the one or more axes. This bias can process peak-hold data as well as resultant values from one or more averaging functions applied to events within each of the qualification zones to employ in the qualification zone positioning and sizing. When the qualification zones each correspond to the one or more axes, then the examples herein select the "outward" most values (along each axis) among the peak hold and the resultant values from one or more averaging functions applied within the qualification zones as a basis for the qualification zone positioning and sizing. These peak hold values and resultant values are updated responsive to transit events through the movement space of the control mechanism. In some examples, the averaging function applied comprises a mean function to produce a mean value among events in the particular qualification zone.

Controller 110 then provides (204) the calibrated movement data to a recipient system for controlling user interface elements. This calibrated movement data can comprise altered movement data that modifies actual movement data from user manipulation for use in more effectively controlling user interface elements, such as on-screen gaming elements. In FIG. 1, control circuitry 130 provides the dynamically calibrated movement data over link 150 for delivery to gaming system 140 for control of user interface elements 141. Gaming system 140 can include one or more user applications which allow a user to interact with on-screen elements provided by user interface elements 141 using controller 110. The user applications can include entertainment games, first-person shooters, strategy games, arcade-style games, productivity applications, social media applications, fitness applications, finance applications, media player applications, conferencing applications, or other applications, including combinations thereof.

Control system 130 can also report fault conditions to gaming system 140 or other systems over link 150. These fault conditions can include when calibration processes encounter errors, when mechanical tolerances exceed threshold levels, or other fault conditions. In one example fault condition, new calibration values are a threshold amount less or more than previous calibration values. This can indicate a problem with motion of an associated control stick, such as a range of motion constrained by debris or other failure of input mechanisms. A low level or high level for a calibration value can be established which limits how much current calibration values can shrink or grow to prevent malfunctioning devices from altering calibration data too severely. Other fault conditions can include when center points are not found, such as due to excessive noise or drift in the measurement data. A fallback to predetermined center or predetermined perimeter boundaries of a movement space can be used when actual measured data fails to provide a mechanical center or vice versa. These fault conditions can be reported to a user via an associated gaming system or via one or more user interface elements of controller 110.

Turning now to a discussion on how the qualification zones can be employed to determine calibrated movement data, such as in operation 202, control circuitry 130 can determine perimeter transit extremes, mechanical center resting points, and cardinal centers, among other movement elements based on the movement data. Movement events of the control stick mechanism can be 'qualified' using the associated qualification zones, and these qualified events are further used to determine perimeter transit extremes, mechanical center resting points, and cardinal centers, or to normalize or otherwise alter the measured movement space to reflect desired movement space dimensional properties.

Maximum excursions of the control stick mechanisms near the outer perimeter of a movement range can be 'qualified' for use in further calculations and processing using the aforementioned qualification zones. Maximum excursions are the most extreme movement samples outward in an associated cardinal direction for a particular movement arc or movement event of the control stick mechanism, subject to certain limitations discussed herein (such as in FIG. 3). Perimeter qualification zones can be used qualify movement or excursions near the perimeter of the movement space, while center qualification zones can be used to qualify resting points of the control stick mechanism. Maximum excursions into the perimeter qualification zones can be referred to as cardinal extreme events for each cardinal direction of control stick 111. Although cardinal directions might include any arbitrary axes or orthogonal directions, cardinal directions in the examples herein include the axes comprising up, down, left, and right for a 2D movement space. Qualification zone means or averages can be derived from sequences of samples of qualified transit extremes or qualified maximum excursions of control stick 111. The mean values of cardinal extreme events within a qualification zone can change over time due to mechanical variations in the input mechanism 120, or trends in user input patterns, among other usage variations.

Qualification of maximum excursions can be handled using the qualification zones to focus calibration processes on a certain subset of movement data within the qualification zones. For example, movement of control stick 111 might need to occur within a cardinal extreme qualification zone to have an associated maximum excursion be considered as qualified. Only one qualified maximum excursion might be derived from each qualified transit through the associated qualification zone. In some examples, the qualification can consider a state of a button integrated into the control stick, and only consider positional data samples or excursions that occur when an integrated button is not being pushed or pressed by a user. Other qualifications can occur, such as secondary qualification zones which prevent consideration of movement data in calibration processes that appears to be spurious or erroneous due to lying outside a statistically relevant perimeter around an existing cardinal extreme event, such as a 3-sigma perimeter, among others. Time thresholds can be applied where transits must persist in the associated qualification zone for a period of time greater than a threshold time for an associated maximum excursion to be qualified. These cardinal extreme qualification zones are discussed in more detail below in FIG. 3.

In FIG. 1, movement calibration system 132 can be employed to determine and qualify the maximum excursion events. Measured movement data for control stick 111 can be represented as positional data samples, such as coordinates within a movement space. Movement calibration system 132 can process these samples, as discussed above, to identify qualified maximum excursions for control stick 111 in each cardinal direction. Qualification zone mean values and peak excursion 'hold' values can be determined over time based on the qualified maximum excursions of the control stick input mechanism for each of the one or more axes.

In some examples, the qualification zone means and peak excursion hold values, along with qualified central resting/center points can be used to re-center, re-scale or re-map movement data into calibrated movement data. This calibrated movement data can be output to an external system, such as gaming system 140, or can be employed by any user application, gaming environment, or other system which employs user input from controller 110. The output data can be scaled to fit a normalized movement space. For example, a raw as-measured measurement space can have associated cardinal extreme events determined and have the raw measurement space scaled to fit a normalized measurement space so the cardinal extreme events lie at a perimeter of the normalized measurement space. Further examples use other customized shapes which exceed the normalized measurement space slightly for enhanced usability of movement space.

As mentioned above, movement calibration system 132 can calibrate measured movement data for output to gaming system 140 as calibrated movement data. As a result of mechanical and electrical tolerances, wear, manufacturing variability, and other factors, a 'cardinal' coordinate center and a mechanical resting center are usually not located at the same point. In some systems, a large dead zone is employed to compensate for a difference in mechanical center from a center of measurement data as well as to compensate for variability among controller hardware. A dead zone inhibits output of movement to an associated gaming system until a control stick has moved beyond the dead zone. However, this dead zone can lead to a large unusable region of the total movement space of a control stick and cause inconsistencies and inaccuracies at the boundary of the dead zone when entering and leaving the dead zone. In the examples herein, a dead zone can be reduced greatly or entirely eliminated using dynamic calibration that incorporates processing a sequence of samples to dynamically determine cardinal extremes, cardinal center points, and mechanical center variations.

A cardinal center can be determined based on monitored cardinal extreme events. The cardinal center can comprise a median point between cardinal maximums, such as a median point as compared to cardinal extreme qualification zone mean values. In further examples, instead of the cardinal extreme qualification zone mean values, a more extreme value among the qualification zone mean values and peak excursion hold values for each cardinal qualification zone are employed to determine the cardinal center. For example, when a 2D movement space is employed, cardinal extreme events can indicate a maximum excursion along each of the axes, such as 'x' and 'y' axes in the up, down, left, and right directions. A cardinal center point can be determined from these cardinal extreme events by taking a midpoint along each axis. Specifically, a cardinal center point comprises a point half-way between x-axis minimum and maximum values and y-axis minimum and maximum values. The particular values employed as maximums in each axis can vary, such as based on the more extreme among the qualification zone means and peak excursion hold values for each cardinal qualification zone, among other considerations.

A mechanical center of control stick 111 can be derived from a sequence of control stick rest actions, which might comprise a sequence of qualified resting points. In FIG. 1, movement calibration system 132 can determine the mechanical center of control stick 111. The mechanical center is related to positions that control stick 111 naturally comes to rest at when un-manipulated by a user. Each time a user releases control stick 111, the associated input mechanism comes to rest near a center of the mechanism. Each rest action can produce a different physical resting position of control stick 111 due to variations in mechanical tolerances, static friction, dynamic friction, mechanical hysteresis, and precision limitations of associated input mechanisms. The mechanical center discussed herein comprises a value derived from applying one or more functions and qualifications to a plurality of measured resting points associated with control stick 111. The mechanical center is derived from measured data, which is a dynamically determined indication of a physical resting position or series of physical resting positions of control stick 111. An averaging function can be applied to a sequence of samples produced from a sequence of rest actions to derive a mechanical center. Thus, many resting points are processed to determine a mechanical center. The averaging function can include a mean, average, weighted moving average, or other statistical functions applied to determine a mechanical center from a sequence of resting points produced from a sequence of rest actions.

Various techniques may be used to determine when control stick 111 has come to rest which indicates a rest action. These techniques can qualify a rest action when control stick 111 moves to a natural mechanical return position and when control stick 111 is not actively engaged by a user, with consideration for spurious movement data. For example, a rest action may be indicated when control stick 111 stays within a predetermined sub-range of a full displacement on each axis for a predetermined amount of time. In a specific example, a rest action may be indicated when control stick 111 stays within 0.1% of a full displacement for 1 second. In a further example, a rest action is indicated when, for each axis, the maximum sampled value minus the minimum sampled value of a predetermined number of preceding samples is less than a predetermined threshold. In yet a further example, a rest action is indicated when, over a predetermined number of samples, the sum of all the absolute values of the differences for each axis or the distance in both axes between each sample and the sample before it is less than a predetermined threshold. In a further example, a rest action is indicated when, for each axis over a predetermined number of samples, the mean absolute deviation or median absolute deviation, or standard deviation is less than a predetermined threshold. In the preceding examples, each axis may share the same threshold, have different thresholds, or have a common threshold that is some function of the values on each axis. In yet further examples, a rest action can be indicated when control stick 111 stays within a predetermined range of a point or function for a required number of samples indicated by a central zone. This point or function may be an arbitrary previous sample or some suitable averaging function of recent samples. This range may be square or rectangular in shape or may take on another suitable shape such as a circle or ellipse. Thresholds or ranges used to indicate a rest action as described herein may be fixed or may be a function of duration/number of samples. For example, a higher range may indicate a rest action after a longer duration, or a shorter duration may indicate a rest action if the range is small. When a rest event is indicated, a resting point may be selected that represents the point at which control stick 111 came to rest. This resting point may be the first point sampled once control stick 111 comes to rest, the last point sampled before control stick 111 begins movement after rest, some other point sampled while control stick 111 is at rest, an averaging function of the sequence of points at which control stick 111 is at rest, the midpoint of the range control stick 111 takes on while at rest, or any other representative point.

To further determine an accurate mechanical center, control circuitry 130 can establish one or more center qualification zones which each comprise a boundary around a distribution of resting points. These center qualification zones can be fixed in size/location or dynamic in size/location. When fixed in size, a center qualification zone can be centered on a predetermined location, such as a midpoint center of a measurement space, a midpoint center of a movement space, or a cardinal center, and have a size that is fixed at predetermined dimensions. When dynamic in size, the center qualification zone size can change over time as a distribution of resting points change due to additional measured samples. Resting points can be considered invalid if not occurring within a center qualification zone, and movement of the control stick can be used to further qualify resting points. For example, movement of control stick 111 might be required to first exit the center qualification zone and re-enter before qualifying as a resting point. Time thresholds can be employed to qualify resting points as well, such as where a control stick must stop moving within a certain time of entry into a center qualification zone, or a control stick must linger for a threshold amount of time in the center qualification zone. Further examples are discussed below for FIG. 3. A second center qualification zone can be employed, such as in FIG. 3, to provide a cross-check on a sizing of a first center qualification zone, which can help to avoid instances where a first center qualification zone used to qualify resting points migrates to an undesirable size over time.

Once various elements of the movement data have been identified, such as the cardinal extreme means, peak hold values, cardinal center, and mechanical center, among other elements, then movement calibration system 132 can establish dynamically calibrated movement data. In some examples, this dynamic calibration includes determining re-centered movement data using the mechanical center to shift measured movement data and place the mechanical center at the cardinal center determined for a movement space. This re-centered movement data is used for control of user interface activity and can be output to an external system, such as gaming system 140, or can be employed by any user application, gaming environment, or other system which employs user input from controller 110.

Movement calibration system 132 can also rescale measured movement data so that the cardinal extreme events are positioned at a perimeter of a normalized movement space. A cardinal center, as defined by properties of the cardinal extreme qualification zones, can also be positioned at a midpoint center of the normalized movement space when cardinal extreme peak events are positioned at the perimeter of the normalized movement space. Control circuitry 130 scales the raw measurement data to fit the normalized movement space according to properties of the cardinal extreme qualification zones. The normalized movement space can have predetermined min/max features comprising +/−1 (with (0,0) as a midpoint center), 0-to-$2^{16}$ bits, or other min/max limits. The scaling typically comprises stretching, compressing, or otherwise altering the measured movement space to fit the normalized movement space so that peak cardinal extreme events are at (or exceed) a perimeter of the normalized movement space. The scaling can occur according to various scaling functions. In some examples, the scaling function is not uniform for the entire space, but can instead be performed on a half-axis basis (i.e. different scaling factor or function for each quadrant of the movement space).

Movement calibration system 132 can also map the rescaled movement data over the normalized movement space to ensure the mechanical center is at the midpoint center of the normalized movement space while keeping the cardinal extreme events at desired locations about the perimeter of the normalized movement space. The mapping can be performed according to various weighting functions to reduce distortion over the normalized movement space. Mapping will vary in a dynamic fashion as the mechanical center and the cardinal extreme events shift when new data points are sampled and processed or due to other attrition-based elimination. Each power-on session of controller 110 might prompt a capture of new maximum excursion data for each cardinal direction. Moreover, the size and shape of a qualification zone for mechanical center determinations can change according to a function applied to new samples of mechanical resting points.

The measurement data, such as resting points, maximum excursions, mechanical centers, qualification zone information, cardinal extreme points, and cardinal centers can be stored in non-volatile memory for use across multiple power cycles of controller 110. A shrinkage or attrition rate, such as 1%, can be applied to the distance of each cardinal extreme point from the cardinal center. A growth rate, such as 1%, can be applied to the size of the cardinal extreme qualification zones or resting point qualification zone to ensure new values are continually qualified to allow the measurement data to dynamically capture changes in mechanical behavior, among other changes. Each power-on can prompt calculation of mechanical centers, qualification zone information, cardinal extreme points, and cardinal centers, among other information. This information can then be used for various calibration processes, such as normalizing, mapping, centering, or scaling operations. Similarly, such shrinkage, growth, or recalculation may also occur periodically, such as every predetermined number of minutes, while controller 110 remains powered on or in operation.

As referred to herein, an averaging function is a function of the previous samples that adequately represents a population of samples, which can be optionally weighted towards more recent data points and/or some original factory calibration. An averaging function can be selected based on available processing resources (such as RAM, persistent storage, compute cycles, hardware-implemented operations, or code space). Some averaging functions include a mean function, a midpoint of the max and min, a median function, the mode of all previous data points, or a "rolling" version of any of the preceding applied only to some arbitrary number of most recent points. Other examples of averaging functions include an infinite impulse response (IIR) filter, a finite impulse response (FIR) filter, or a low pass filter. For example, an IIR filter $y_{n+1} = w \cdot x_{n+1} + (1-w) \cdot y_n$ where $0 < w \leq 1$ is the weight of each new point (e.g., w=0.05) may be an averaging function selected for low processing resource applications. If an extensive factory calibration is performed, a constant weight might be employed. Alternatively, if minimal or no factory calibration is performed, an averaging function might be selected to have a decaying weight for a predetermined number of data points after which the weight remains constant.

Figure 3:
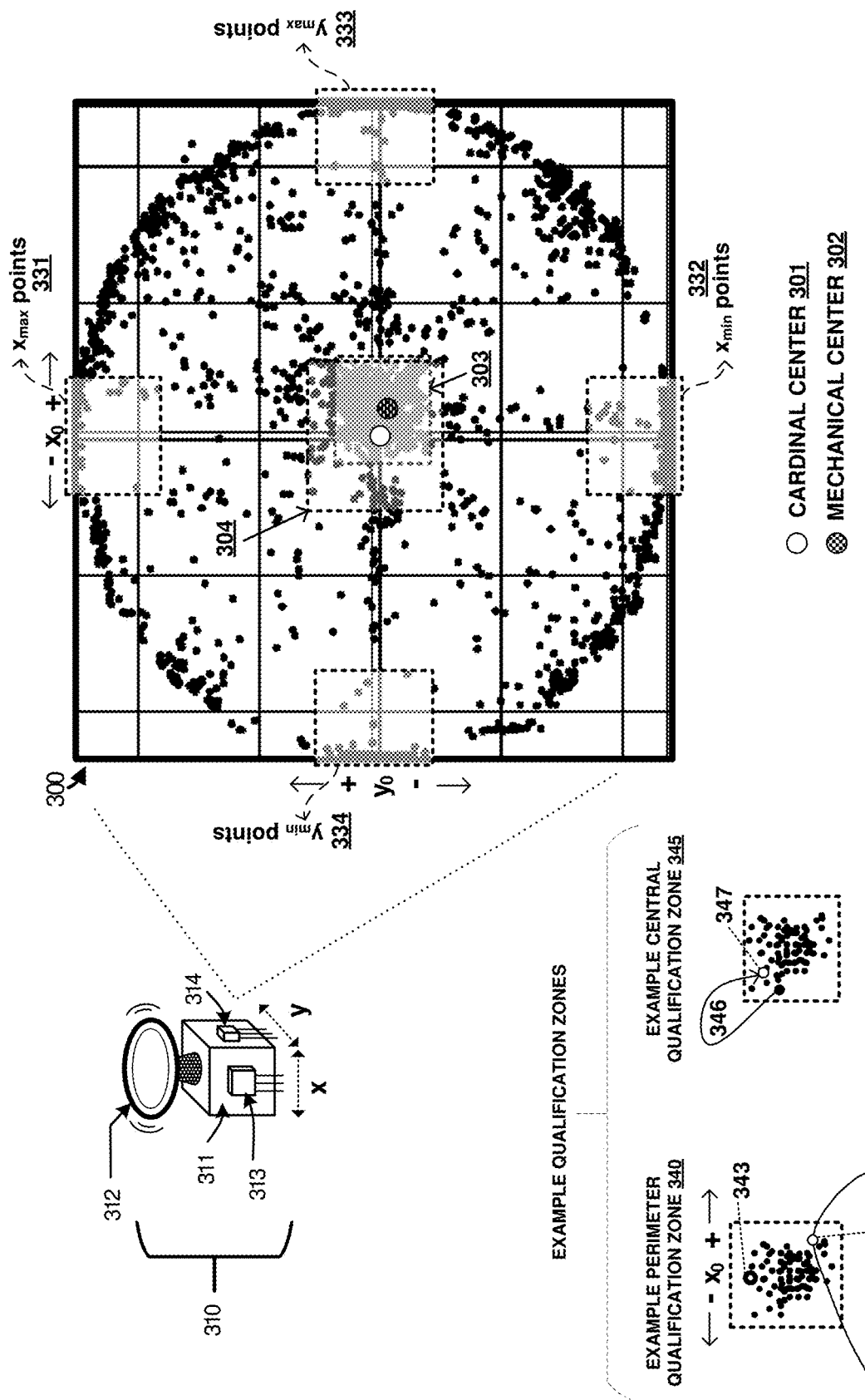
FIG. 3 is a system diagram of a user input device in an implementation.

To further illustrate qualification zones used in dynamic calibration in a controller device, FIG. 3 is provided. FIG. 3 is a system diagram illustrating control stick 310, as an example of a user input device in an implementation. Control stick 310 can include elements found in controller 110 of FIG. 1, such as control sticks 111 or 112, although variations are possible. Control stick 310 includes mechanism 311, thumbstick 312, and position sensors 313-314. A two-dimensional map of sampled movement data for control stick 310 is shown in graph 300.

Turning first to the elements of control stick 310, mechanism can include one or more electromechanical elements which receive and respond to user manipulation of thumbstick 312. These mechanisms can include electromechanical elements, tension elements, spring elements, motor elements, servo elements, as well as structural elements which support and position thumbstick 312 with respect to measurement elements. Position sensors 313-314 can comprise potentiometers, position determination circuitry, angular resolvers, rotary encoders, optoelectronic position sensors, magnetic sensors such as Hall effect sensors or magnetoresistive sensors, encoders, capacitive sensors, inductive sensors, or other measurement elements and sensing elements. Analog-to-digital (A/D) conversion elements can also be include in position sensors 313-314 to translate analog measurement or positioning signals into digital movement data. These digital representations can be introduced to processing elements for transfer to gaming systems for control of user interface elements.

In operation, a user can manipulate thumbstick 312. A control system, such as that described in FIGS. 1 and 9, can monitor signals associated with the user manipulation of thumbstick 312 to determine dynamic calibration information. Graph 300 illustrates a representation of sampled data points for control stick 310 which arise from periodic sampling of movement data associated with control stick 310. For illustrative purposes, this movement data is arranged in a two-dimensional graph with a 'y' axis relating to up and down movement of thumbstick 312, and a 'x' axis relating to left and right movement of thumbstick 312. A midpoint for each axis is indicated in the middle of graph 300.

Example perimeter or "cardinal extreme" qualification zones are configured to include the most extreme physical position reachable in each cardinal direction, as indicated by four regions in graph 300, namely $x_{max}$ qualification zone 331, $x_{min}$ qualification zone 332, $y_{max}$ qualification zone 333, and $y_{min}$ qualification zone 334. Motion of a control stick within these regions yields transit extremes (maximum excursions) for the control stick. A maximum excursion might be produced once per each entry/exit arc thorough a qualification zone as the maximum value reached while within the qualification zone or according to an averaging function of a sequence of samples of a movement arc within the qualification zone. 'Peak' cardinal extreme events can be determined from a plurality of maximum excursions within each qualification zone. Cardinal extreme peak values can be determined over time, where each qualification zone can store a most extreme excursion or peak outward movement event that occurs over a period of time. These cardinal extreme peak values can be stored as peak hold values that comprise the cardinal extreme events mentioned above, but updated as new peak excursions are monitored.

The cardinal extreme qualification zones such as $x_{max}$ qualification zone 331, $x_{min}$ qualification zone 332, $y_{max}$ qualification zone 333, and $y_{min}$ qualification zone 334 can be dynamically sized and positioned. In other examples, some sizing or positional properties of the cardinal extreme qualification zones can be of a fixed, predefined, or factory calibrated size. Although qualification zones 331-334 are shown as rectangular shapes, it should be understood that other shapes can instead be employed such as triangles, elliptical or semi-elliptical shapes, and trapezoids.

In particular, cardinal extreme qualification zones can be dynamically sized and positioned based on functions applied to a sequence of excursions within a particular qualification zone. Particulars of the dynamic sizing and positioning are discussed below in FIGS. 4-8. The example rectangular shapes and sizes of qualification zones 331-334 can have an outer boundary defined in the direction along the associated axis outward/away from the origin, and can be defined by a predetermined distance from a designated point in the corresponding qualification zone. An inner boundary can be defined in the direction along the associated axis inward/toward the origin, and can be related to the qualification zone mean or be set by a fixed value or a value derived from the qualification zone mean. The two 'side' boundaries of each qualification zone can be centered about the associated axis and spaced apart by a predetermined amount.

As mentioned above, qualified transit extremes are those that occur within cardinal extreme qualification zones 331-334. In the example shown in FIG. 3, one qualified transit extreme is derived from each qualified movement input/transit through the cardinal extreme qualification zone, which can comprise the most extreme value monitored during the transit through the cardinal extreme qualification zone. One or more time thresholds can be established for the transits. One example time threshold includes when a transit must persist within the cardinal extreme qualification zone for a period of time greater than a certain threshold for the transit extreme to be qualified. If the input transit through the qualification zone contains any points that exceed the outer qualification zone boundary, the entire input transit can be ignored and not qualified in some examples.

Example perimeter qualification zone 340 in FIG. 3 shows a qualification zone established around a distribution of maximum excursions. In this example, qualification zone 340 is for the $x_{max}$ cardinal direction (331), and similar concepts would apply in the other cardinal directions. Over time, as the distribution changes due to new sampled maximum excursions, the qualification zone can be updated. Example control stick motion 341 is shown in FIG. 3 for qualification zone 340. Motion 341 can illustrate thumbstick 312 arcing through qualification zone 340 by entering and then exiting qualification zone 340 to produce a maximum excursion 342. As can be seen, many samples of maximum excursions which occur over time are located within qualification zone 340, and indeed changes in new samples of maximum excursions can be used to establish a resultant qualification zone. Example peak hold value 343 is shown which represents a peak excursion monitored within the qualification zone over a predetermined period of time. Since example excursion 341 did not exceed peak hold value 343, then peak hold value 343 would remain at the same value. In some of the examples herein, peak hold determination can also include peak hold with "walk back" functionality, which is discussed in the further examples of qualification zones and changes to qualification zones in FIGS. 4-8.

Advantageously, the cardinal extreme determination processes lead to accurate determination of qualification zone means and cardinal "peak excursion hold" values using one or more functions of the sequence of qualified transit extremes. When qualification zone means and cardinal peak excursion hold values are set too low (such as too close to the center of the measurement space), mechanical travel in a control stick is wasted. Conversely, when qualification zone means and cardinal "peak excursion hold" values are set too high (such as too far from the center of the measurement space), the control stick might not be as responsive as in a properly determined example. Moreover, when qualification zone means and cardinal peak excursion hold values are set too high, then a full range of control by the control stick might not be available to a user because the normalized movement space does not reach full scale when the control stick is at a maximum physical extent.

From the cardinal extreme events, cardinal center 301 can be established. This cardinal center is determined from a center point derived from the cardinal extreme events, namely a center point in each axis between the cardinal extreme events. Graph 300 is centered on cardinal center 301 in FIG. 3. A mechanical center point is also determined, indicated by mechanical center 302 in FIG. 3. Each rest action of thumbstick 312 can produce a different resting position due to variations in mechanical tolerances, static friction, dynamic friction, mechanical hysteresis, and precision limitations of associated input mechanisms. An averaging function can be applied to a sequence of resting points to determine a mechanical center. Thus, many resting points are processed to determine a mechanical center.

In FIG. 3, two center qualification zones are shown (303 and 304), although in some examples only a single center qualification zone 303 is employed. In FIG. 3, center qualification zone 303 is referred to as a primary center qualification zone and center qualification zone 304 is referred to as a secondary center qualification zone. Primary and secondary qualification zones can also be applied for perimeter qualification zones, as seen in FIGS. 4-8. In FIG. 3, center qualification zones 303 and 304 can be established and each comprises a boundary around a center point—center qualification zone 303 is centered on the current mechanical center and center qualification zone 304 is centered on the cardinal center, which can instead be a midpoint center of a normalized movement space when a normalized movement space is used.

Center qualification zones 303 and 304 can be used to qualify resting points to allow invalid or spurious resting points to be ignored. Resting points can be considered invalid if not occurring within qualification zone 303. In some examples, the qualification can also consider a state of a button integrated into the control stick, and only consider positional data that occurs when an integrated button is not being pushed or pressed by a user. Movement actions of thumbstick 312 can be used to further qualify resting points. For example, movement of thumbstick 312 might be required to first exit the qualification zone or some other suitably sized zone and re-enter before qualifying as a resting point. In further examples, a multi-part qualification can be established, where a resting point is only qualified as such when all conditions are met. These conditions can include a qualification zone exit-reentry conditions, only one resting point per entry into the qualification zone (or other suitable zone), time thresholds met, and an associated button on the control stick is not pressed.

Center qualification zone 303 or center qualification zone 304 can be dynamically sized, and can change over time as new resting points are sampled. Center qualification zone 303 or center qualification zone 304 can instead be fixed in size, such as based on factory calibration data or a size input by a user or operator. Center qualification zone 304 might be sized based on the size of center qualification zone 303. A function can be applied to a sequence of resting points to determine a size of qualification zone 303. Center qualification zone 303 size can also depend on the absolute difference between a mechanical center and a mean of center qualification zone 304, the distribution of primary center qualification zone 303 qualified resting points (e.g. a predetermined quantity of mean deviations), and the distribution of center qualification zone 304 qualified resting points (e.g. another predetermined quantity of mean deviations). Qualification zone 303 can have side lengths, elliptical radii, or other geometric parameters of some multiple of a deviation function for each axis or other function for each axis.

Qualification zone 303 can have predetermined maximum and minimum sizes to force stability among qualification zone 303. Qualification zone 304 can provide limits on a sizing of qualification zone 303, which can help to avoid instances where qualification zone 303, as used to qualify resting points, migrates to an undesirable size over time.

Example motion 346 is shown in FIG. 3 for example center qualification zone 345. Motion 346 can illustrate thumbstick 312 initially being at rest, moving outward and exiting qualification zone 345, then re-entering qualification zone 345 to come to rest at potential resting point 347. As can be seen, each resting point for example center qualification zone 345 might be at a different location. Example center qualification zone 345 in FIG. 3 is established around a distribution of resting points. As the distribution changes due to new measurement data samples, an updated qualification zone can be established. Although example center qualification zone 345 is shown as a rectangular shape, it should be understood that other shapes can instead be employed.

As mentioned above, a mechanical center point can be derived from a sequence of qualified resting points using a weighted moving average or other function. The resting points can be qualified that occur inside the primary center qualification zone 303 and meet one or more timing thresholds. In a first example time threshold, input movement must stop changing within a certain time of entering the center qualification zone. In a second example time threshold, the input movement must change by no more than certain amounts for more than a certain time. In other words, a qualified rest action comprises movement data associated with control stick 312 indicating a change in the movement data less than a threshold distance for more than a threshold time. Other time thresholds can be applied, and combinations of the time thresholds can be included. In the example in FIG. 3, one resting point is qualified per center qualification zone entry, and the input movement must first exit the primary center qualification zone for a new resting point to be qualified, as seen with movement 346 for a single example center qualification zone.

Fault conditions can also be established for sizing the perimeter or central qualification zones. For example, when a qualification zone falls below a size minimum threshold or exceeds a size maximum threshold, a fault condition can be triggered. This fault condition can prevent the qualification zone from increasing in size beyond the maximum size threshold or decreasing in size below the minimum size threshold.

Turning now to the operation of dynamic calibration of movement data for perimeter qualification zones, FIGS. 4-8 are presented. FIGS. 4-7 include example movement data reflective of a two-dimensional movement space, such as for a control stick mechanism. Other control mechanisms can instead be employed using similar concepts, which might include fewer or greater axes of travel. The operations of FIGS. 4-8 can be handled by elements of FIG. 1, such as movement calibration system 132; by elements of FIG. 3, such as control stick mechanism 310; or by elements of FIG. 9, including combination thereof.

Figure 4:
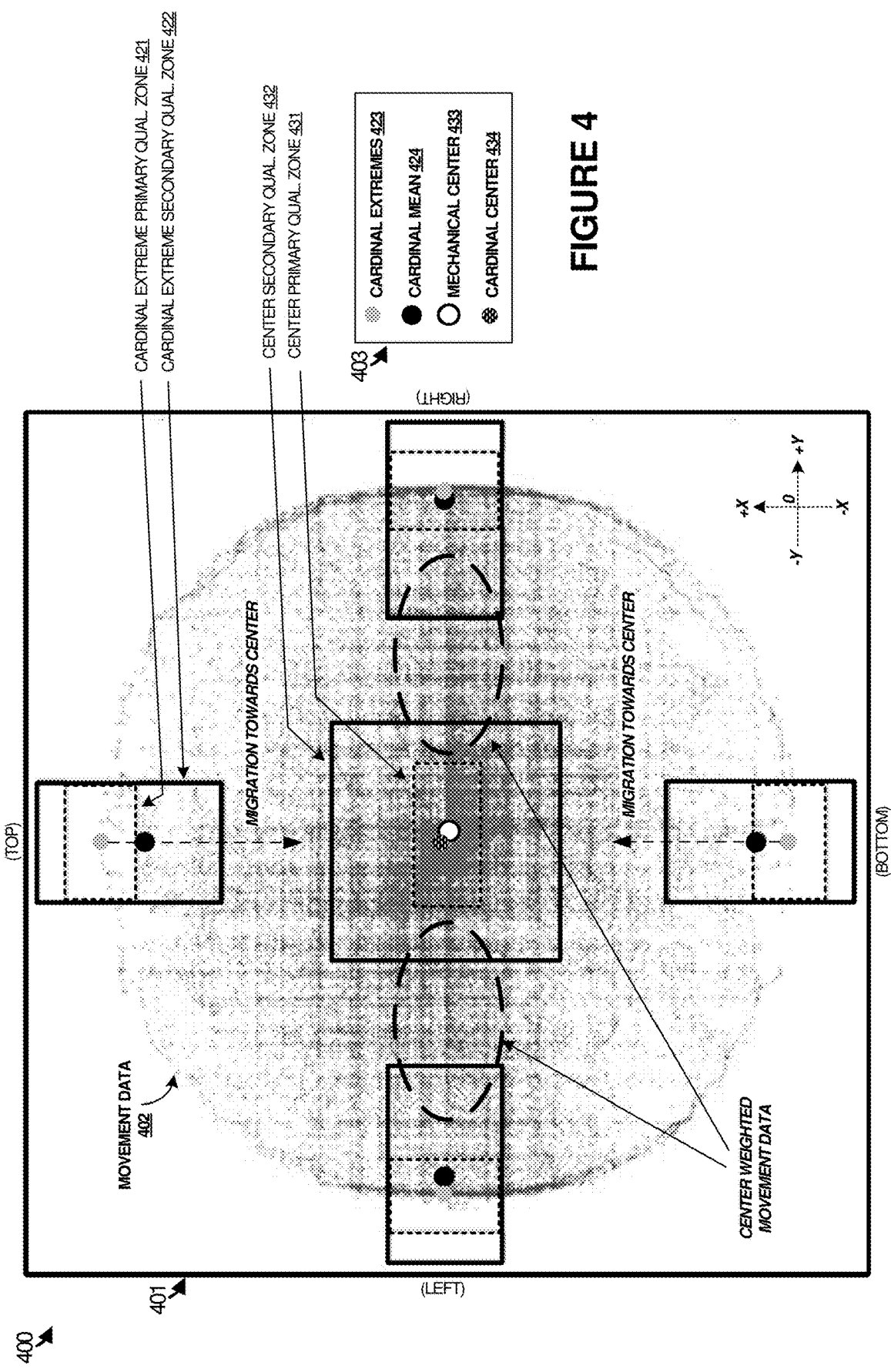
FIG. 4 illustrates user input device calibration in an implementation.

FIG. 4 illustrates user input device calibration process 400 in an implementation. Graph 401 includes a sample set of movement data 402 measured over time for a control stick mechanism. Example axes 'X' and 'Y' are shown in FIG. 4, with a center of graph 401 corresponding to an origin ('0') about which the axes are positioned. A top side of graph 401 corresponds to a +X direction, a bottom side of graph 401 corresponds to a −X direction, a left side of graph 401 corresponds to a −Y direction, and a right side of graph 401 corresponds to a +Y direction.

Several qualification zones are employed in FIG. 4, similar to those employed in FIG. 3. However, FIG. 4 illustrates a more complex set of qualification zones than FIG. 3, with both primary and secondary perimeter qualification zones for each cardinal extreme, and both primary and secondary perimeter qualification zones for the center or origin. Primary cardinal extreme qualification zone 421 is shown for the +X direction, along with secondary cardinal extreme qualification zone 422. Each cardinal extreme direction along the axes (e.g. +X, −X, +Y, −Y) has corresponding primary and secondary cardinal extreme qualification zones, but only the +X direction is labeled in FIG. 4 for clarity. Likewise, the central region has primary center qualification zone 431 and secondary center qualification zone 432. Key 403 indicates several features of graph 401, namely cardinal extreme values 423, cardinal (qual. zone) mean values 424, mechanical center 433, and cardinal center 434.

Movement data 402 appears in a generally circular pattern in graph 401 due to the nature of the user movement of a corresponding control stick. However, when the perimeter qualification zones are positioned and sized based on uniformly weighted averaging windows, density gradation of the movement data can result in a tendency of the perimeter qualification zones to migrate towards the center, as seen in FIG. 4. This can be a result of center-weighted movement data, such as during gameplay using first-person shooters or other games that prefer movement in the 'Y' axis of graph 401 to the detriment of movement in the 'X' axis.

Figure 5:
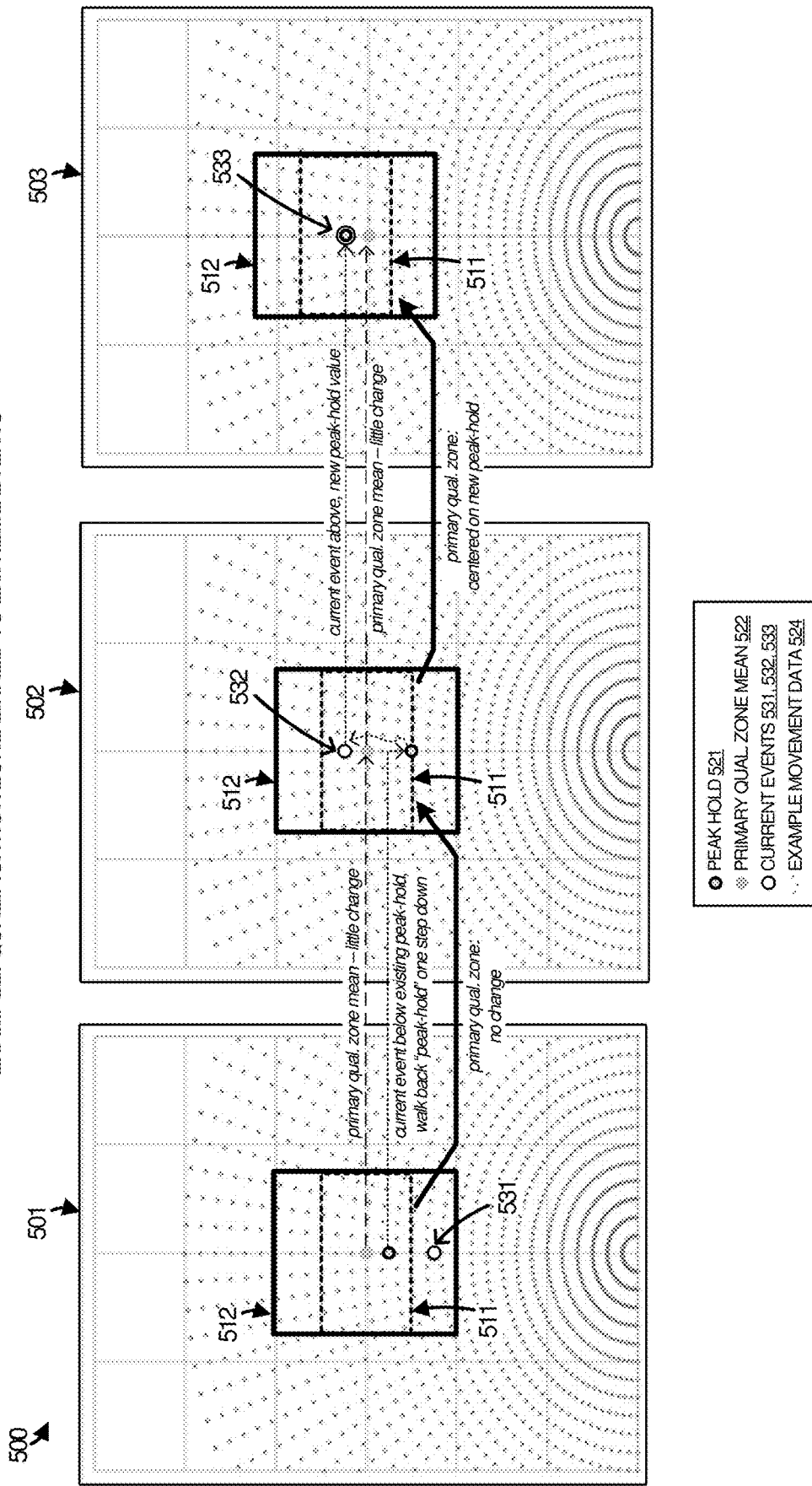
FIG. 5 illustrates user input device calibration in an implementation.
Figure 6:
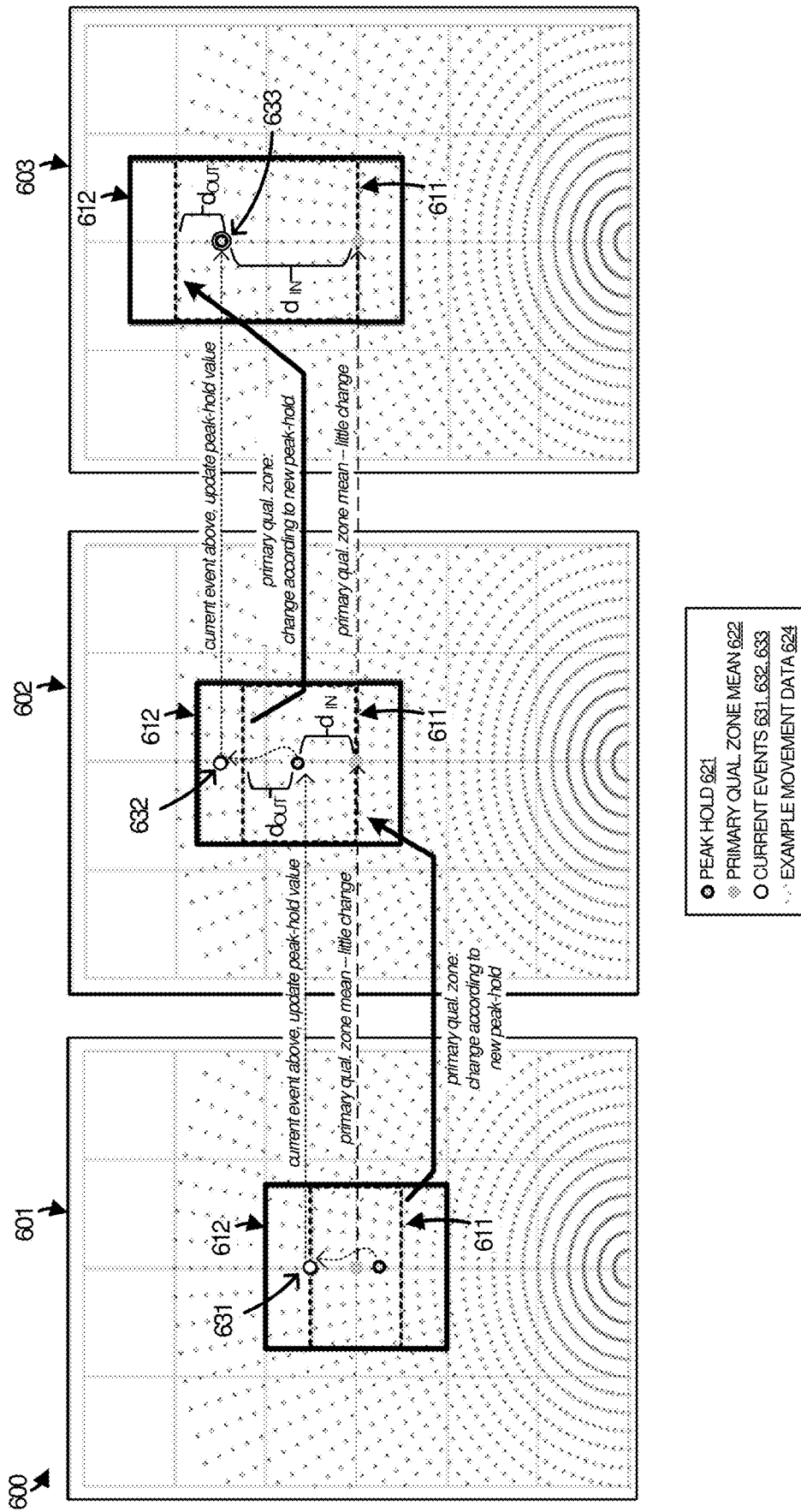
FIG. 6 illustrates user input device calibration in an implementation.
Figure 7:
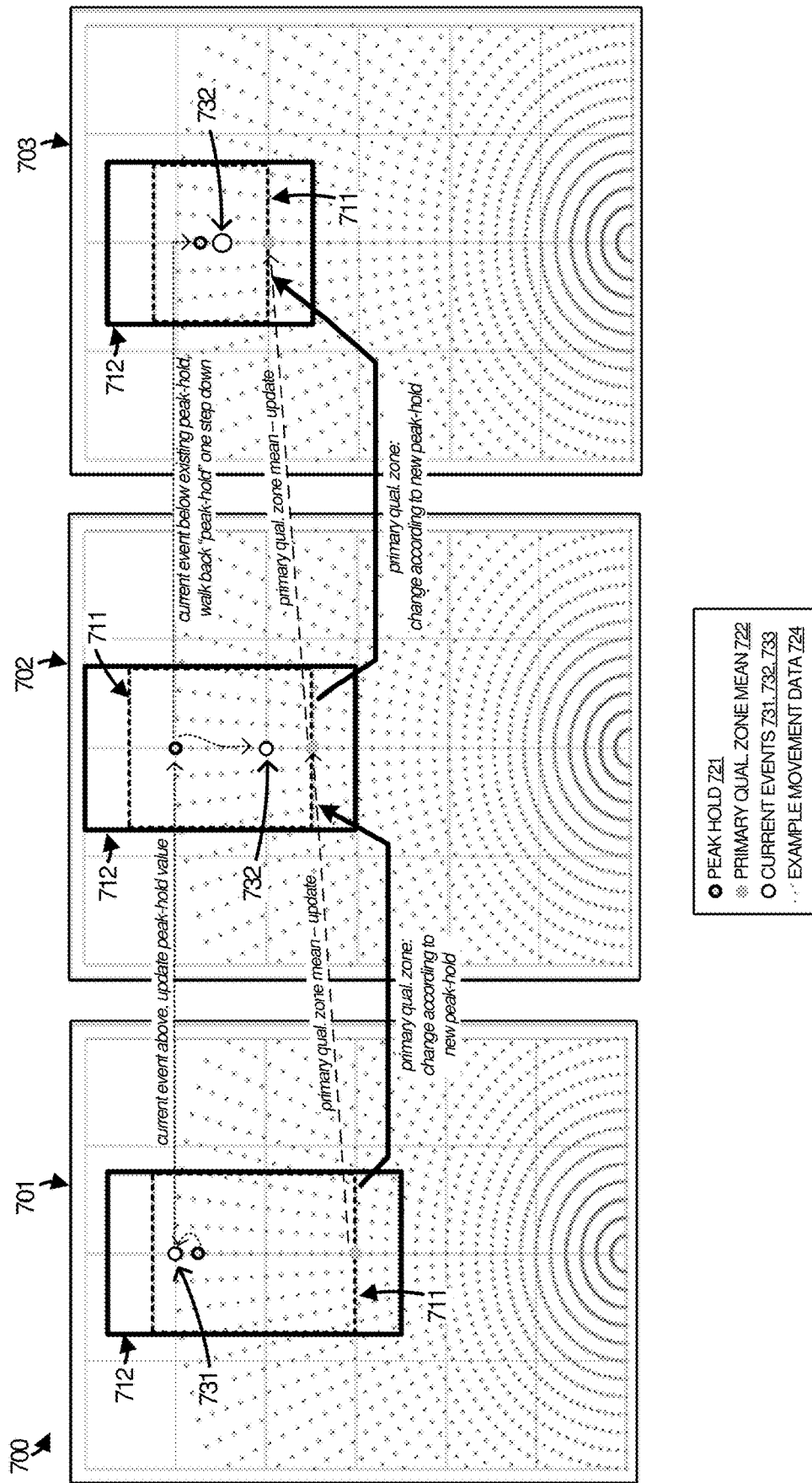
FIG. 7 illustrates user input device calibration in an implementation.

To counteract these event gradients and maintain effective calibration of control mechanisms, various enhanced processes for handling of perimeter qualification zones can be employed. FIGS. 5-7 illustrate example operations for enhanced handling of perimeter qualification zones. In FIGS. 5-7, an example cardinal extreme region is focused on to provide a clearer picture of the example operations. Namely, a +X cardinal extreme region is presented in FIGS. 5-7. However, it should be understood that the operations of FIGS. 5-7 can be applied to any cardinal extreme region (e.g. +X, −X, +Y, −Y).

Various properties and values are determined in FIGS. 5-7 based on the associated movement data measured over the particular time period. A first example value comprises a peak hold value determined for movement events along a particular axis, where the peak hold value represents a peak excursion that occurs within any of the associated primary qualification zone or associated secondary qualification zone. A second example value comprises a mean value for movement events occurring within the associated primary qualification zone (and not events occurring within the secondary qualification zone). For each graph shown in FIGS. 5-7, a current movement event is shown, and other/example movement data are shown. The current movement event typically triggers changes to properties of the primary qualification zone and properties of secondary qualification zone, and potentially triggers changes to the peak hold values and mean values.

Turning first to FIG. 5, a first example operation 500 illustrates determination of sizing and positioning of qualification zones based at least in part on extreme events within the qualification zones. As peak hold values and mean values change due to new movement data/events, primary qualification zone 511 and secondary qualification zone 512 are potentially updated. A movement bias is provided for the qualification zones, which biases positioning in the 'outward' direction along the associated axis. This bias is provided by at least applying a maximizing function to the peak hold and mean values. The maximizing function includes where the primary qualification zone is driven outward along a corresponding axis responsive to peak hold values being updated due to new movement excursions greater than a current mean value of the primary qualification zone. The maximizing function also includes where the primary qualification zone is centered around the current mean value when the corresponding peak hold value is less extreme in the outward direction than the current mean value. Thus, the maximizing function provides for an asymmetrical response for the primary qualification zone, biased outwards along the corresponding axis.

To further illustrate this maximizing function, graphs 501-503 illustrate states of primary qualification zone 511 positioned within secondary qualification zone 512. A peak hold value 521 is shown for each state based on movement data within primary qualification zone 511 and secondary qualification zone 512, and a mean value 522 is shown for each state based on movement data within primary qualification zone 511. New/current events are also labeled for each graph 501-503 (e.g. events 531, 532, 533), with example movement data 524 shown as small dots.

Graph 501 illustrates an initial state of primary qualification zone 511 and secondary qualification zone 512, with associated peak hold and mean values. In graph 501, primary qualification zone 511 is initially centered about the mean value of primary qualification zone 511 due to the mean value being more extreme in value than the current peak hold value. Secondary qualification zone 512 is sized proportionally to primary qualification zone 511 in this example. For example, horizontal sizing of secondary qualification zone 512 matches the horizontal sizing of primary qualification zone 511, while vertical sizing of secondary qualification zone 512 is a predetermined multiplier of the vertical sizing of primary qualification zone 511. It should be understood that sizing variations among the primary and secondary qualification zones are possible.

When a new movement event occurs, as indicated by event 531, updates are processed for associated peak hold and mean values, which might prompt changes to primary qualification zone 511 and secondary qualification zone 512. Specifically, current event 531 occurs below an existing peak hold value in graph 501, and responsively the peak hold value is updated to be less extreme by one predetermined step or discrete amount. This updating of the peak hold value comprises a "walk back" in the peak hold value. Graph 502 shows the updated peak hold value having been moved 'inward' toward the origin by one step. Since many movement events have occurred in the past upon which the mean value is based, there is little change in the mean value between graph 501 and 502. Thus, the mean value still remains more extreme in extent along the associated axis than the updated peak hold value, and primary qualification zone 511 remains centered about the mean value.

Graph 502 shows another new movement event 532 occurring, which in this case is more extreme in extent than the current peak hold value of graph 502. Responsively, the peak hold value is updated to reflect this more extreme movement excursion, as shown updated in graph 503. As with the previous new movement event, the mean value of the primary qualification zone does not change much, due in part to the large amount of historical movement events computed into the mean value calculation. However, in graph 503, the updated peak hold value is now greater in extent, i.e. more extreme, than the mean value for the primary qualification zone. Responsively, primary qualification zone 511 is repositioned to be centered about the updated peak hold value in graph 503.

Advantageously, primary qualification zone 511 is positioned according to the most extreme among a peak hold value and a mean value associated with movement data in the associated perimeter region. This positioning produces a maximizing function that ensures changes to the qualification zones are biased outward along the associated cardinal direction. The outward bias can produce enhanced operation and calibration for a user input device, such as for control stick mechanisms that encounter movement data density weighted in an unbalanced manner.

Turning now to FIG. 6, a second example operation 600 illustrates further biasing of sizing and positioning of qualification zones based in part on extreme events within the qualification zones. As peak hold values and mean values change due to new movement data/events, primary qualification zone 611 and secondary qualification zone 612 are potentially updated. As with FIG. 5, a movement bias is provided for the qualification zones, which asymmetrically biases positioning in the 'outward' direction along the associated axis based in part on more extreme values among peak hold and mean values.

To further illustrate this maximizing function, graphs 601-603 illustrate states of primary qualification zone 611 and secondary qualification zone 612. A peak hold value 621 is shown for each state based on movement data within primary qualification zone 611 and secondary qualification zone 612, and a mean value 622 is shown for each state based on movement data within primary qualification zone 611. New/current events are also labeled for each graph 601-603 (e.g. events 631, 632, 633), with example movement data 624 shown as small dots.

Graph 601 illustrates an initial state of primary qualification zone 611 and secondary qualification zone 612, with associated peak hold and mean values. In graph 601, primary qualification zone 611 is initially centered about the mean value of primary qualification zone 611 due to the mean value being more extreme in value than the current peak hold value. Secondary qualification zone 612 is sized proportionally to primary qualification zone 611, and contains primary qualification zone 611.

When a new movement event occurs, as indicated by event 631, updates are processed for associated peak hold and mean values, which might prompt changes to primary qualification zone 611 and secondary qualification zone 612. Specifically, current event 631 occurs above an existing peak hold value in graph 601, and responsively the peak hold value is updated to match the value of current event 631. Graph 602 shows the updated peak hold value having been moved 'outward' away from the origin to correspond to event 631. Since many movement events have occurred in the past upon which the mean value is based, there is little change in the mean value between graph 601 and 602. Thus, the mean value will now be less extreme in extent along the associated axis than the updated peak hold value, and primary qualification zone 611 is attempted to be re-centered about the updated peak hold value, as seen in graph 602.

However, in graph 602, the attempted re-positioning of primary qualification zone 611 to be re-centered on the updated peak hold value threatens to exclude the mean value of primary qualification zone 611 from primary qualification zone 611 itself. In this example, the inner boundary of primary qualification zone 611 is advantageously adjusted to ensure that the mean value of primary qualification zone 611 is still located within the extent of primary qualification zone 611. The sizing of primary qualification zone 611 can be of a predetermined minimum size, such as having the outer and inner boundaries in the vertical direction set to a minimum amount with regard to the current center point/value (i.e. the more extreme among the peak hold value and the mean value). However, as graph 602 shows, to maintain the mean value within primary qualification zone 611 when re-centered on the peak hold value, the inner boundary is increased by a distance away from the center point to ensure that the mean value is still within primary qualification zone 611. Specifically, $d_{out}$ is a first amount, while $d_{in}$ is of a second, larger, amount. The outer distance from the center point for primary qualification zone 611, namely $d_{out}$, can still remain at a default or predetermined amount, while the inner distance from the center point ($d_{in}$) has increased beyond the default amount.

Graph 602 shows another new movement event 632 occurring, which in this case is more extreme in extent than the current peak hold value of graph 602. The peak hold calculation in this example considers movement events that occur in not only the primary qualification zone, but also in the secondary qualification zone. Thus, even though movement event 632 is outside of the boundary of primary qualification zone 611, this event is still considered as a potential new peak hold value. Responsively, the peak hold value is updated to reflect this more extreme movement excursion, as shown updated in graph 603. As with the previous new movement event, the mean value of the primary qualification zone does not change much, due in part to the large amount of historical movement events computed into the mean value calculation. In graph 603, the updated peak hold value is still more extreme than the mean value for the primary qualification zone, and even more extreme than a previous peak hold value. Responsively, primary qualification zone 611 attempted to be re-centered about the updated peak hold value in graph 603.

However, in graph 603, the attempted re-positioning of primary qualification zone 611 to be re-centered on the updated peak hold value again threatens to exclude the mean value of primary qualification zone 611 from primary qualification zone 611 itself. In this example, the inner boundary of primary qualification zone 611 is advantageously adjusted to ensure that the mean value of primary qualification zone 611 is still located within the extent of primary qualification zone 611. As graph 602 shows, to maintain the mean value within primary qualification zone 611 when re-centered on the peak hold value, the inner boundary is further increased by a distance away from the center point to ensure that the mean value is still within primary qualification zone 611. Specifically, $d_{out}$ is still the first amount as in graph 602, while $d_{in}$ is of a third, even larger amount.

Advantageously, primary qualification zone 611 is not only positioned according to the most extreme among a peak hold value and a mean value associated with movement data in the associated perimeter region, but also has sizing that considers the mean value of movement data that lies within primary qualification zone 611. The inner boundary of primary qualification zone 611 is prevented from excluding the mean value of primary qualification zone 611, ensuring that further movement events can only move primary qualification zone 611 outward along the associated axis. This provides further bias or asymmetrical response of primary qualification zone 611 to new movement events. Moreover, the total area of primary qualification zone 611 is resultantly increased when the mean value is ensured to remain in primary qualification zone 611, allowing for more opportunity to capture events within primary qualification zone 611.

This positioning and sizing ensures changes to the qualification zones are biased outward along the associated cardinal direction, while still allowing for the mean values of primary qualification zone 611 to naturally adjust according to new movement data. The outward bias can produce enhanced operation and calibration for a user input device, such as for control stick mechanisms that encounter movement data density weighted in an unbalanced manner.

Turning now to FIG. 7, a third example operation 700 illustrates further biasing of sizing and positioning of qualification zones based in part on extreme events within the qualification zones. As peak hold values and mean values change due to new movement data/events, primary qualification zone 711 and secondary qualification zone 712 are potentially updated. As with FIGS. 5 and 6, a movement bias is provided for the qualification zones, which asymmetrically biases positioning in the 'outward' direction along the associated axis based in part on more extreme values among peak hold and mean values.

To further illustrate this maximizing function, graphs 701-703 illustrate states of primary qualification zone 711 and secondary qualification zone 712. A peak hold value 721 is shown for each state based on movement data within primary qualification zone 711 and secondary qualification zone 712, and a mean value 722 is shown for each state based on movement data within primary qualification zone 711. New/current events are also labeled for each graph 701-703 (e.g. events 731, 732, 733), with example movement data 724 shown as small dots.

Graph 701 illustrates an initial state of primary qualification zone 711 and secondary qualification zone 712, with associated peak hold and mean values. Graph 701 can be a continuation of the process illustrated in graph 603 of FIG. 6, although graph 701 can be illustrative of any sequence. In graph 701, primary qualification zone 711 is initially positioned about a peak hold value, with an inner boundary of primary qualification zone 711 positioned to ensure a mean value of primary qualification zone 711 is included in primary qualification zone 711. An upper boundary of primary qualification zone 711 is positioned according to a predetermine amount greater than the peak hold value. Secondary qualification zone 712 is sized proportionally to primary qualification zone 711, and contains primary qualification zone 711.

When a new movement event occurs, as indicated by event 731, updates are processed for associated peak hold and mean values, which might prompt changes to primary qualification zone 711 and secondary qualification zone 712. Specifically, current event 731 occurs above an existing peak hold value in graph 701, and responsively the peak hold value is updated to match the value of current event 731. Graph 702 shows the updated peak hold value having been moved 'outward' away from the origin to correspond to event 731. Since many movement events have occurred in the past upon which the mean value is based, there is little change in the mean value between graph 701 and 702. Thus, the mean value will continue to be less extreme in extent along the associated axis than the updated peak hold value, and primary qualification zone 711 is attempted to be re-centered about the updated peak hold value, as seen in graph 702.

However, in graph 702, the mean value of primary qualification zone 711 is shown as being updated in an exaggerated amount to illustrate outward movement of the inner boundary of primary qualification zone 711. Again, the inner boundary of primary qualification zone 711 is advantageously adjusted to ensure that the mean value of primary qualification zone 711 is still located within the extent of primary qualification zone 711. Graph 702 shows another new movement event 732 occurring, which in this case is less extreme in extent than the current peak hold value of graph 702. Responsively, the peak hold value is updated to reflect this less extreme movement excursion, as shown updated in graph 703. As mentioned above, the peak hold value is reduced by one predetermined step amount when the new movement event is lower than the current peak hold value.

In graph 703, the updated peak hold value is still more extreme than the mean value for the primary qualification zone. Responsively, primary qualification zone 711 attempted to be re-centered about the updated peak hold value in graph 703. In graph 703, the mean value of primary qualification zone 711 is shown as being updated in an exaggerated amount to illustrate outward movement of the inner boundary of primary qualification zone 711. Again, the inner boundary of primary qualification zone 711 is advantageously adjusted to ensure that the mean value of primary qualification zone 711 is still located within the extent of primary qualification zone 711.

Advantageously, FIG. 7 illustrates the outward migration of the mean value of primary qualification zone 711 over time, due in part to the asymmetrical bias provided by the enhanced operations herein. Specifically, since primary qualification zone 711 is positioned about the more extreme value among the peak hold value for primary qualification zones 711/712 and the mean value for primary qualification zone 711, a first outward drive is encouraged. Then, since the inner boundary for primary qualification zone 711 is determined to always include the mean value of primary qualification zone 711, then a second outward drive is encouraged. These two outward biases encourage migration of primary qualification zone 711 and the mean values in the outward direction of a movement space. The outward bias can produce enhanced operation and calibration for a user input device, such as for control stick mechanisms that encounter movement data density weighted in an unbalanced manner.

In a further example, not shown, once a peak hold value has migrated enough to exist on an outer perimeter limit of the movement space, the associated primary qualification zone will be attempted to be centered at the perimeter of the movement space. This establishes an advantageous scenario where the associated qualification zone ensures that a complete range of a control stick mechanism can be employed for user input and is considered in calibration processes, such as cardinal center determination and perimeter determination, as well as normalization, re-sizing, re-mapping, and re-scaling of movement data to preferred shapes, sizes, and extents. Further peak excursions that are beyond a mean value of the associated primary qualification zone will tend to move the mean outward along the associated axis and shrink the qualification zone boundaries to the minimum predetermined size once the mean value has migrated away from a boundary of the qualification zone. Eventually, even the mean values might even migrate to the outer perimeter limits of the movement space, further maximizing usage of the mechanical extent of the control mechanism and enhancing calibration processes.

In the examples herein, perimeter and center qualification zones are employed in calibration processes for movement data associated with user control input or other input types. Perimeter qualification zones are asymmetrically biased to migrate more easily in an outward direction toward the perimeter of a movement space. In the examples herein, this can be achieved in part due to a maximizing function that considers peak hold values for movement data as well as mean values for perimeter qualification zones. The peak hold values associated with movement data are configured to move outward more rapidly than inward. The perimeter qualification zones are also configured to move outward more easily than inward, and the primary qualification zone inner boundaries are ensured to include the mean values of the associated primary qualification zones, advantageously leading to future events pushing the mean values outward. Technical effects include more accurate calibration of user input devices to ensure more accurate control of user interface elements. One example is more accurate calibration of a gaming controller for user input on gaming consoles, leading to precision control of on-screen elements and graphical user interfaces. Further technical effects include more accurate control of machines that rely upon user input devices, such as industrial mechanisms and machinery, aircraft, naval vessels, spacecraft, or other user input controls.

Figure 8:
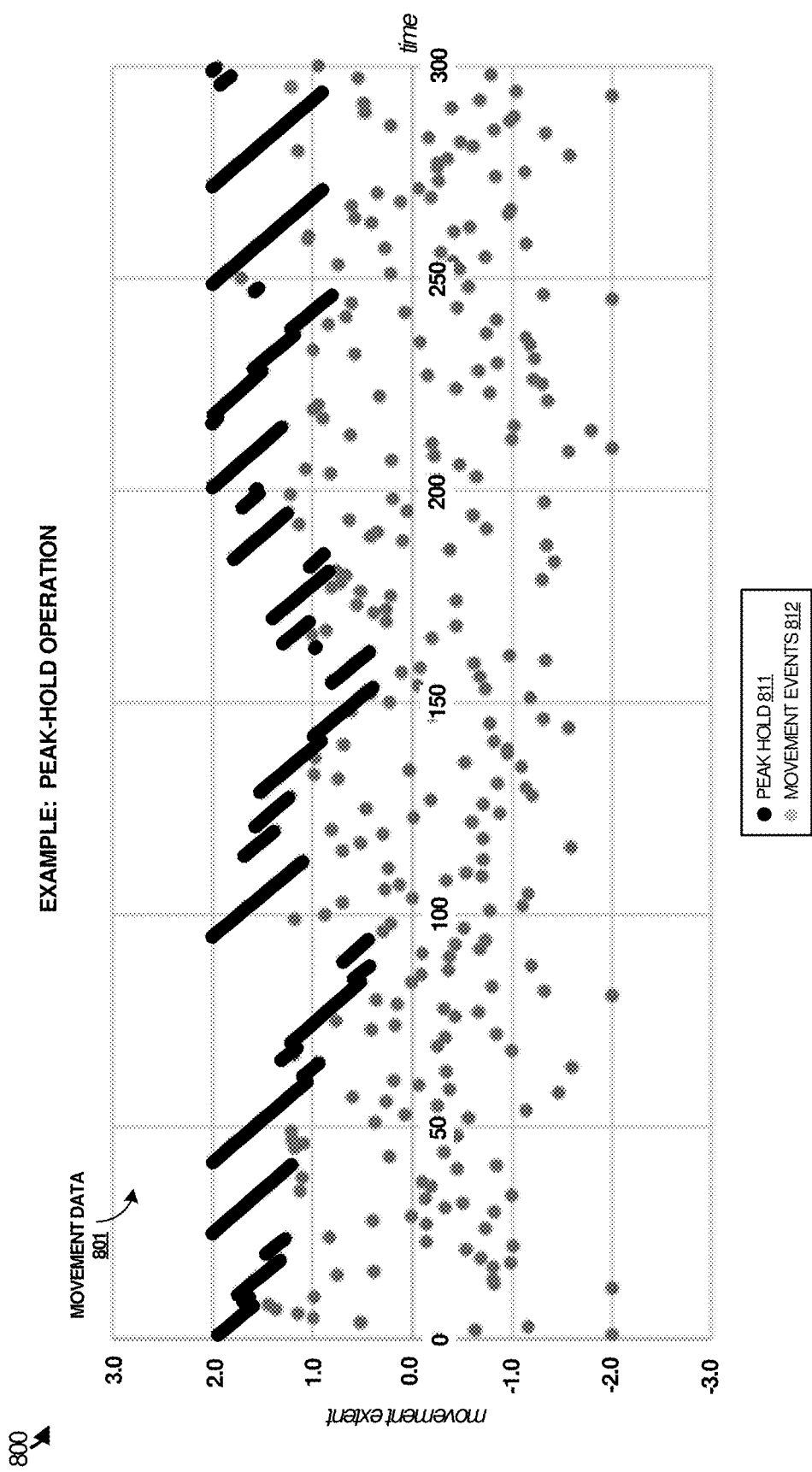
FIG. 8 illustrates user input device calibration in an implementation.

FIG. 8 illustrates example graph 800 with movement data 801. Graph 800 shows enhanced determination of peak hold values along a vertical axis of graph 800, as updated according to new movement events that occur over time indicated along the horizontal axis of graph 800. Each new movement event 812 is evaluated against a currently stored peak hold value 811 to determine how to modify or update the peak hold value. When a new movement event is more extreme (with regard to a corresponding axis) than a current peak hold value, then the peak hold value is updated to match the value of the new movement event. When a new movement event is less extreme (with regard to the corresponding axis) than a current peak hold value, then the peak hold value is decreased toward the origin in extent by a predetermined amount, i.e. a predetermined discrete step amount.

FIG. 9 illustrates user input device 900 that is representative of any system or collection of systems in which the various dynamic calibration operational architectures, scenarios, and processes disclosed herein may be implemented. For example, user input device 900 can be employed in control circuitry 130 of FIG. 1, control stick 310 of FIG. 3, or to establish any of the calibration processes of FIGS. 1-8. Examples of user input device 900 can be incorporated into further devices and systems, such as virtual reality devices, augmented reality devices, gaming machines, gaming platforms, laptop computers, tablet computers, desktop computers, servers, cloud computing platforms, hybrid computers, virtual machines, smart televisions, smart watches and other wearable devices, as well as any variation or combination thereof. User input device 900 might also be incorporated into user interface systems for aviation, military, vehicular operation, robotic control, or industrial control systems.

User input device 900 includes input platform 901 and may be implemented as a single apparatus, system, or device or may be implemented in a distributed manner as multiple apparatuses, systems, or devices. For example, user input device 900 can comprise one or more microcontrollers, microprocessors, application-specific integrated circuits (ASICs), field-programmable gate arrays (FPGA), or discrete logic and associated circuitry, including combinations thereof. Input platform 901 may optionally include additional devices, features, or functionality not discussed for purposes of brevity.

Input platform 901 comprises processing system 902, storage system 903, software 905, communication interface system 907, and user interface system 908. Processing system 902 is operatively coupled with storage system 903, communication interface system 907, and user interface system 908. Storage system 903 can optionally include non-volatile memory (NVM) 904, which can comprise a programmable read-only memory, electrically-erasable programmable read-only memory (EEPROM), or flash memory, among other non-volatile memory types. When included, NVM 904 can store calibration data, sampled data, sample sets, or other measurement data and associated information.

Processing system 902 loads and executes software 905 from storage system 903. Software 905 includes controller environment 906, which is representative of the touch processes discussed with respect to the preceding Figures. When executed by processing system 902 to enhance input processing and handling for gaming controller applications, software 905 directs processing system 902 to operate as described herein for at least the various processes, operational scenarios, and sequences discussed in the foregoing implementations. Input platform 901 may optionally include additional devices, features, or functionality not discussed for purposes of brevity.

Referring still to FIG. 9, processing system 902 may comprise a micro-processor and processing circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 903 can include non-volatile memory 904, which can comprise a programmable read-only memory, electrically-erasable programmable read-only memory (EEPROM), or flash memory, among other non-volatile memory types.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing enhanced calibration processing and handling for gaming systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include controller environment 906. Software 905 may also comprise firmware or some other form of machine-readable processing instructions executable by processing system 902.

In general, software 905 may, when loaded into processing system 902 and executed, transform a suitable apparatus, system, or device (of which input platform 901 is representative) overall from a general-purpose computing system into a special-purpose computing system customized to facilitate enhanced touch input processing and handling for applications. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Controller environment 906 includes one or more controller applications 922 comprising user input service 923 and dynamic calibration service 924. Controller environment 906 also optionally includes operating system 921. OS 921 can provide a software platform on which user input service 923 and dynamic calibration service 924 is executed. User input service 923 comprises a movement interface that receives movement signals or movement data representative of user manipulation. The movement signals or movement data can be received through user interface system 908, such as from control sticks, thumbsticks, triggers, buttons, touch controls, motion controls, keyboards, keypads, or other user input hardware. User input service 923 can provide feedback to users in examples where indicator lights, video screens, vibration feedback, or resistance features are provided in user input device 900.

Dynamic calibration service 924 performs calibration processes on measurement data associated with the various user input mechanisms, such as control sticks. Dynamic calibration service 924 can perform any of the calibration processes described here. For example, user input service 923 can receive measurement data captured by user interface elements, such as by A/D conversion circuitry associated with user input elements, and provide this measurement data to dynamic calibration service 924. Dynamic calibration service 924 performs dynamic qualification zone processing to provide centering, scaling, and mapping of the measurement data to normalized movement spaces. Dynamic calibration service 924 provides calibrated and normalized movement data as output data. This output data can be transferred by communication interface system 907 in some examples for delivery to a host system or gaming system to control user interface elements. In other examples, dynamic calibration service 924 can provide this output data over one or more software or logical interfaces for use by gaming systems to control user interface elements.

In one example, dynamic calibration service 924 includes several individual modules for performing the processes described herein, namely, qualification zone module 925 and calibration module 926. Qualification zone module 925 handles dynamic sizing and positioning of qualification zones based at least on movement data within the corresponding qualification zones. Calibration module 926 determines calibrated movement data based on the measured/raw movement data and any modifications applied using cardinal centers, mechanical centers, qualification zones, qualification zone mean values, or other information. Calibration module 926 can scale movement data to fit normalized movement spaces, shift or re-center measurement data to place a mechanical center at a midpoint center of a normalized movement space or to align with a cardinal center, establish perimeter regions to shift mechanical centers to midpoint centers of normalized movement spaces, and map the shifted data according to one or more weighting or mapping functions, among other operations.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 908 can include circuitry elements or processing elements for receiving user manipulation data associated with user input elements. Various circuitry can be employed to sense user input, translate the input from an analog signal to digital signaling, and transfer the digital signals to elements of processing system 902. Amplifiers, filters, or other signal processing circuitry can be employed to modify the signals generated by user input. For examples, user interface system 908 can include A/D conversion circuitry to convert analog signaling associated with user input elements into digital representations. In other examples, external A/D conversion circuitry 910 is provided and user interface system 908 can include one or more digital interfaces for communicating and controlling A/D conversion circuitry 910 or user input device equipment.

User interface system 908 can include output devices such as a display, speakers, haptic devices, indicator lights, force feedback elements, and other types of output devices. User interface system 908 might provide output or receive input over a network interface, such as communication interface system 907 that communicates with individual user input elements. User interface system 908 may also include associated user interface software executable by processing system 902 in support of the various user input and output devices discussed above.

Communication between input platform 901 and other systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, personal area networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), Bluetooth interfaces (such as IEEE 802.15.1), WiFi (IEEE 802.11), as well as any other suitable communication protocol, variation, or combination thereof. Wired and wireless links can be employed for input platform 901 to communicate with a gaming system, host system, or other system that hosts a user interface platform which a user employs user input device 900 to control user interface elements.

Certain inventive aspects may be appreciated from the foregoing disclosure, of which the following are various examples.

Example 1

A user input system, comprising a movement interface configured to receive movement data representative of user manipulation of a control mechanism, and a movement calibration system. The movement calibration system is configured to determine calibrated movement data based at least in part on a movement space normalized using at least qualification zones that qualify peak excursions of the control mechanism in one or more axes. Responsive to the movement data, the movement calibration system is configured to establish updates to the qualification zones that bias drift of the qualification zones outward in the one or more axes, and provide the calibrated movement data for use in controlling one or more user interface elements with the control mechanism.

Example 2

The user input system of Examples 1, where the movement calibration system is further configured to monitor transit events in the qualification zones indicated by the movement data to maintain peak hold values in the one or more axes and resultant values of an averaging function applied to each of the qualification zones, and establish the updates to the qualification zones based at least on performing comparisons among the peak hold values and the resultant values.

Example 3

The user input system of Examples 2, where the peak hold values for the qualification zones are updated to reflect the peak excursions in associated qualification zones based on the peak excursions exceeding current peak hold values for the associated qualification zones; and where the peak hold values are reduced by a predetermined amount based on the peak excursions in the associated qualification zones falling below the current peak hold values for the associated qualification zones.

Example 4

The user input system of Examples 2, where the resultant values of the qualification zones comprise mean values among movement events in the qualification zones along a corresponding axis of the qualification zones.

Example 5

The user input system of Examples 2, where the movement calibration system is further configured to perform the comparisons by at least determining outermost values in the one or more axes among the peak hold values and the resultant values for each of the qualification zones, and establish the updates by at least positioning the qualification zones based on associated ones of the outermost values.

Example 6

The user input system of Examples 5, where positioning the qualification zones comprises centering the qualification zones on the associated ones of the outermost values.

Example 7

The user input system of Examples 5, where the movement calibration system is further configured to further establish the updates by at least updating on-axis sizing of the qualification zones based on the associated ones of the outermost values, where the on-axis sizing of outward-facing sides of the qualification zones are determined according to a predetermined amount beyond the associated ones of the outermost values, and where the on-axis sizing of inward-facing sides of the qualification zones are determined to ensure the resultant values are included in the qualification zones.

Example 8

The user input system of Examples 1, where the movement calibration system is further configured to qualify the peak excursions of the control mechanism by at least monitoring transits of the control mechanism indicated by the movement data that occur within the qualification zones and determining transit extremes with respect to the one or more axes occurring in the qualification zones.

Example 9

A method of operating a user input system, the method comprising monitoring movement data representative of user manipulation of a control mechanism, and determining calibrated movement data based at least in part on a movement space normalized using at least qualification zones that qualify peak excursions of the control mechanism in one or more axes. Responsive to the movement data, the method includes establishing updates to the qualification zones that bias drift of the qualification zones outward in the one or more axes, and providing the calibrated movement data for use in controlling one or more user interface elements with the control mechanism.

Example 10

The method of Examples 9, further comprising monitoring transit events in the qualification zones indicated by the movement data to maintain peak hold values in the one or more axes and resultant values of an averaging function applied to each of the qualification zones, and establishing the updates to the qualification zones based at least on performing comparisons among the peak hold values and the resultant values.

Example 11

The method of Examples 10, further comprising updating the peak hold values for the qualification zones to reflect the peak excursions in associated qualification zones based on the peak excursions exceeding current peak hold values for the associated qualification zones, and reducing the peak hold values by a predetermined amount based on the peak excursions in the associated qualification zones falling below the current peak hold values for the associated qualification zones.

Example 12

The method of Examples 10, where the resultant values of the qualification zones comprise mean values among movement events in the qualification zones along a corresponding axis of the qualification zones.

Example 13

The method of Examples 10, further comprising performing the comparisons by at least determining outermost values in the one or more axes among the peak hold values and the resultant values for each of the qualification zones, and establishing the updates by at least positioning the qualification zones based on associated ones of the outermost values.

Example 14

The method of Examples 13, where positioning the qualification zones comprises centering the qualification zones on the associated ones of the outermost values.

Example 15

The method of Examples 13, further comprising further establishing the updates by at least updating on-axis sizing of the qualification zones based on the associated ones of the outermost values, where the on-axis sizing of outward-facing sides of the qualification zones are determined according to a predetermined amount beyond the associated ones of the outermost values, and where the on-axis sizing of inward-facing sides of the qualification zones are determined to ensure the resultant values are included in the qualification zones.

Example 16

The method of Examples 9, further comprising qualifying the peak excursions of the control mechanism by at least monitoring transits of the control mechanism indicated by the movement data that occur within the qualification zones and determining transit extremes with respect to the one or more axes occurring in the qualification zones.

Example 17

A user input apparatus for a user device, comprising one or more computer readable storage media, a processing system operatively coupled with the one or more computer readable storage media, and an input calibration service comprising program instructions stored on the one or more computer readable storage media. Based on being read and executed by the processing system, the program instructions direct the processing system to at least process movement data indicating user manipulation of a control mechanism to determine at least one or more qualification zones individually corresponding to cardinal directions of the control mechanism, where one or more the qualification zones each qualify peak excursions of the control mechanism in an associated cardinal direction. Based on being read and executed by the processing system, the program instructions further direct the processing system to at least perform updates to the one or more qualification zones based at least on the peak excursions that occur within corresponding qualification zones to bias drift of at least boundaries of the one or more qualification zones outward along the associated cardinal direction, determine calibrated movement data based at least in part on the one or more qualification zones, and provide the calibrated movement data for use in controlling one or more user interface elements with the control mechanism.

Example 18

The user input apparatus of Examples 17, comprising further program instructions, that when executed by the processing system, direct the processing system to at least monitor transit events in the one or more qualification zones indicated by the movement data to maintain peak hold values in the cardinal directions and mean values of the qualification zones; perform comparisons among the peak hold values and the mean values in each of the one or more qualification zones; and determine at least sizing and positioning for the one or more qualification zones based at least on outermost values among the peak hold values and the mean values in the associated cardinal directions.

Example 19

The user input apparatus of Examples 18, where the peak hold values for the one or more qualification zones are updated to reflect the peak excursions in associated qualification zones based on the peak excursions exceeding current peak hold values for the associated qualification zones; where the peak hold values are reduced by a predetermined amount based on the peak excursions in the associated qualification zones falling below the current peak hold values for the associated qualification zones; and where the mean values of the qualification zones comprise mean values among movement events in the qualification zones along the associated cardinal direction.

Example 20

The user input apparatus of Examples 18, comprising further program instructions, that when executed by the processing system, direct the processing system to at least determine positions for the one or more qualification zones by at least centering the one or more qualification zones on associated ones of the outermost values; and determine sizing for the one or more qualification zones by at least updating on-axis sizing of the one or more qualification zones based on the associated ones of the outermost values, where the on-axis sizing of outward-facing sides of the one or more qualification zones are determined according to a predetermined amount beyond the associated ones of the outermost values, and where the on-axis sizing of inward-facing sides of the one or more qualification zones are determined to ensure the mean values are included in the qualification zones.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A system, comprising:
    a movement calibration system configured to determine qualification zones that qualify peak excursions in movement data associated with manipulation of a control mechanism in one or more axes;
    the movement calibration system configured to establish updates to the qualification zones based on changes in the movement data, wherein the updates bias drift of the qualification zones outward in the one or more axes;
    the movement calibration system configured to determine calibrated movement data based at least on the updates to the qualification zones; and
    a communication interface configured to provide the calibrated movement data for use in controlling one or more user interface elements with the control mechanism.

2. The system of claim 1, wherein the movement calibration system is further configured to:
    monitor transit events in the qualification zones indicated by the movement data to maintain peak hold values in the one or more axes and resultant values of at least an averaging function applied to each of the qualification zones; and
    establish the updates to the qualification zones based at least on performing comparisons among the peak hold values and the resultant values.

3. The system of claim 2, wherein the peak hold values for the qualification zones are updated in accordance with the peak excursions in associated qualification zones based on the peak excursions exceeding current peak hold values for the associated qualification zones; and
    wherein the peak hold values are reduced by a predetermined amount based on the peak excursions in the associated qualification zones falling below the current peak hold values for the associated qualification zones.

4. The system of claim 2, wherein the resultant values of the qualification zones comprise mean values among movement events in the qualification zones along a corresponding axis of the qualification zones.

5. The system of claim 2, wherein the movement calibration system is further configured to:
    perform the comparisons by at least determining outermost values in the one or more axes among the peak hold values and the resultant values for each of the qualification zones; and
    establish the updates by at least positioning the qualification zones based on associated ones of the outermost values.

6. The system of claim 5, wherein positioning the qualification zones comprises centering the qualification zones on the associated ones of the outermost values.

7. The system of claim 5, wherein the movement calibration system is further configured to:
    further establish the updates by at least updating on-axis sizing of the qualification zones based on the associated ones of the outermost values, wherein the on-axis sizing of outward-facing sides of the qualification zones are determined according to a predetermined amount beyond the associated ones of the outermost values, and wherein the on-axis sizing of inward-facing sides of the qualification zones are determined to ensure the resultant values are included in the qualification zones.

8. The system of claim 1, wherein the movement calibration system is further configured to:
    qualify the peak excursions of the control mechanism by at least monitoring transits of the control mechanism indicated by the movement data that occur within the qualification zones and determining transit extremes with respect to the one or more axes occurring in the qualification zones.

9. A method comprising:
    determining qualification zones that qualify peak excursions in movement data associated with manipulation of a control mechanism in one or more axes;
    establishing updates to the qualification zones based on changes in the movement data, wherein the updates bias drift of the qualification zones outward in the one or more axes;
    determining calibrated movement data based at least on the updates to the qualification zones; and
    providing the calibrated movement data for use in controlling one or more user interface elements with the control mechanism.

10. The method of claim 9, further comprising:
    monitoring transit events in the qualification zones indicated by the movement data to maintain peak hold values in the one or more axes and resultant values of at least an averaging function applied to each of the qualification zones; and establishing the updates to the qualification zones based at least on performing comparisons among the peak hold values and the resultant values.

11. The method of claim 10, further comprising:
updating the peak hold values for the qualification zones to in accordance with the peak excursions in associated qualification zones based on the peak excursions exceeding current peak hold values for the associated qualification zones; and
reducing the peak hold values by a predetermined amount based on the peak excursions in the associated qualification zones falling below the current peak hold values for the associated qualification zones.

12. The method of claim 10, wherein the resultant values of the qualification zones comprise mean values among movement events in the qualification zones along a corresponding axis of the qualification zones.

13. The method of claim 10, further comprising:
performing the comparisons by at least determining outermost values in the one or more axes among the peak hold values and the resultant values for each of the qualification zones; and
establishing the updates by at least positioning the qualification zones based on associated ones of the outermost values.

14. The method of claim 13, wherein positioning the qualification zones comprises centering the qualification zones on the associated ones of the outermost values.

15. The method of claim 13, further comprising:
further establishing the updates by at least updating on-axis sizing of the qualification zones based on the associated ones of the outermost values, wherein the on-axis sizing of outward-facing sides of the qualification zones are determined according to a predetermined amount beyond the associated ones of the outermost values, and wherein the on-axis sizing of inward-facing sides of the qualification zones are determined to ensure the resultant values are included in the qualification zones.

16. The method of claim 9, further comprising:
qualifying the peak excursions of the control mechanism by at least monitoring transits of the control mechanism indicated by the movement data that occur within the qualification zones and determining transit extremes with respect to the one or more axes occurring in the qualification zones.

17. A calibration apparatus, comprising:
one or more computer readable storage media;
a processing system operatively coupled with the one or more computer readable storage media; and
program instructions stored on the one or more computer readable storage media that, based on being read and executed by the processing system, direct the processing system to at least:
determine qualification zones that qualify peak excursions in movement data associated with manipulation of a control mechanism in one or more axes;
establish updates to the qualification zones based on changes in the movement data, wherein the updates bias drift of the qualification zones outward in the one or more axes;
determine calibrated movement data based at least on the updates to the qualification zones; and
provide the calibrated movement data for use in controlling one or more user interface elements with the control mechanism.

18. The calibration apparatus of claim 17, comprising further program instructions, that when executed by the processing system, direct the processing system to at least:
monitor transit events in the one or more qualification zones indicated by the movement data to maintain peak hold values in associated cardinal directions and mean values of the qualification zones; and
perform comparisons among the peak hold values and the mean values in each of the one or more qualification zones; and
determine at least sizing and positioning for the one or more qualification zones based at least on outermost values among the peak hold values and the mean values in the associated cardinal directions.

19. The calibration apparatus of claim 18, wherein the peak hold values for the one or more qualification zones are updated in accordance with the peak excursions in associated qualification zones based on the peak excursions exceeding current peak hold values for the associated qualification zones;
wherein the peak hold values are reduced by a predetermined amount based on the peak excursions in the associated qualification zones falling below the current peak hold values for the associated qualification zones; and
wherein the mean values of the qualification zones comprise mean values among movement events in the qualification zones along the associated cardinal direction.

20. The calibration apparatus of claim 18, comprising further program instructions, that when executed by the processing system, direct the processing system to at least:
determine positions for the one or more qualification zones by at least centering the one or more qualification zones on associated ones of the outermost values;
determine sizing for the one or more qualification zones by at least updating on-axis sizing of the one or more qualification zones based on the associated ones of the outermost values, wherein the on-axis sizing of outward-facing sides of the one or more qualification zones are determined according to a predetermined amount beyond the associated ones of the outermost values, and wherein the on-axis sizing of inward-facing sides of the one or more qualification zones are determined to ensure the mean values are included in the qualification zones.

\* \* \* \* \*